(12) United States Patent
Labuda et al.

(10) Patent No.: US 9,671,424 B2
(45) Date of Patent: Jun. 6, 2017

(54) METHODS AND SYSTEMS FOR OPTIMIZING FREQUENCY MODULATION ATOMIC FORCE MICROSCOPY

(71) Applicant: The Royal Institution for the Advancement of Learning/McGill University, Montreal (CA)

(72) Inventors: Aleksander Labuda, Montreal (CA); Peter Grutter, Montreal (CA); Yoichi Miyahara, Montreal (CA); William Paul, Montreal (CA); Antoine Roy-Gobeil, Outremont (CA)

(73) Assignee: The Royal Institution of the Advancement of Learning/McGill University, Montreal (CA)

( * ) Notice: Subject to any disclaimer, the term of this patent is extended or adjusted under 35 U.S.C. 154(b) by 0 days.

(21) Appl. No.: 14/384,791

(22) PCT Filed: Mar. 13, 2013

(86) PCT No.: PCT/CA2013/000216
§ 371 (c)(1),
(2) Date: Sep. 12, 2014

(87) PCT Pub. No.: WO2013/134853
PCT Pub. Date: Sep. 19, 2013

(65) Prior Publication Data
US 2015/0020245 A1    Jan. 15, 2015

Related U.S. Application Data

(60) Provisional application No. 61/609,994, filed on Mar. 13, 2012.

(51) Int. Cl.
*G01Q 60/24* (2010.01)
*G01Q 30/06* (2010.01)
*G01Q 60/34* (2010.01)

(52) U.S. Cl.
CPC ............. *G01Q 60/24* (2013.01); *G01Q 30/06* (2013.01); *G01Q 60/34* (2013.01)

(58) Field of Classification Search
CPC ......... G01Q 60/24; G01Q 60/34; G01Q 30/06
(Continued)

(56) References Cited

U.S. PATENT DOCUMENTS 5,066,858 A * 11/1991 Elings .................... B82Y 35/00
250/306
5,466,935 A * 11/1995 Ray ........................ B82Y 35/00
250/306

(Continued)

OTHER PUBLICATIONS

Labuda, et al "Decoupling conservative and dissipative forces in frequency modulation atomic force microscopy" Phys. Rev. B 84(12), 125433 (2011).*

(Continued)

*Primary Examiner* — Michael Maskell
(74) *Attorney, Agent, or Firm* — Norton Rose Fulbright Canada LLP

(57) ABSTRACT

Energy dissipation measurements in Frequency Modulation-Atomic Force Microscopy (FM-AFM) should provide additional information for dynamic force measurements as well as energy dissipation maps for robust material properties imaging as they should not be dependent directly upon the cantilever surface interaction regime. However, unexplained variabilities in experimental data have prevented progress in utilizing such energy dissipation studies. The inventors have demonstrated that the frequency response of the piezoacoustic cantilever excitation system, traditionally assumed flat, can actually lead to surprisingly large apparent damping by the coupling of the frequency shift to the drive-amplitude signal. Accordingly, means for correcting this source of apparent damping are presented allowing dissipation measurements to be reliably obtained and quantitatively com- (Continued)

pared to theoretical models. The methods are non-destructive and can be both easily and routinely integrated into FM-AFM measurements within vacuum environments where measurements exploiting prior art solutions cannot be performed.

6 Claims, 10 Drawing Sheets

(58) Field of Classification Search
 USPC ..................................................... 850/4, 33
 See application file for complete search history.

(56) References Cited

U.S. PATENT DOCUMENTS

| | | | | |
|---|---|---|---|---|
| 2009/0307809 | A1* | 12/2009 | Ziegler | B82Y 35/00 850/62 |
| 2010/0031404 | A1* | 2/2010 | Rychen | B82Y 35/00 850/33 |
| 2010/0218288 | A1* | 8/2010 | Sarioglu | B82Y 35/00 850/33 |
| 2011/0271411 | A1 | 11/2011 | Rassier et al. | |

OTHER PUBLICATIONS

Hölscher et al., Measurement of Conservative and Dissipative Tip-Sample Interaction Forces with a Dynamic Force Microscope Using the Frequency Modulation Technique, Physical Review B, 2001, pp. 075402-6 to 075402-6, vol. 64, no. 7, The American Physical Society, US.
Hoffman et al., Energy Dissipation in Atomic Force Microscopy and Atomic Loss Processes, Physical Review Letters, 2001, vol. 87, No. 26, pp. 265502-1 to 265502-4, The American Physical Society, US.
Labuda et al., Comparison of Photothermal and Piezoacoustic Excitation Methods for Frequency and Phase Modulation Atomic Force Microscopy in Liquid Environments, AIP Advances, Jun. 9, 2011, vol. 1, Issue 2, pages 022136-1 to 0223136-17, American Institute of Physics, US.
Proksch et al., Energy Dissipation Measurements in Frequency-Modulated Scanning Probe Microscopy, Nanotechnology, Oct. 14, 2010, vol. 21, p. 455705, IOP Publishing, US.
D.A. Walters et al., "Short Cantilevers for Atomic Force Microscopy", Review of Scientific Instruments, vol. 67, 1996, pp. 3583 to 3590, US.
C.P. Green et al., "Small Amplitude Oscillations of a Thin Beam Immersed in a Viscous Fluid Near a Solid Surface", Physics of Fluids, vol. 17, 073103, 2005, pp. 1 to 12, US.
M.B. Viani et al., "Small Cantilevers for Force Spectroscopy of Single Molecules", Journal of Applied Physics, vol. 36, No. 4, 1999, pp. 2258 to 2262, US.
M.S. Kilic et al., "Steric Effects in the Dynamics of Electrolytes at Large Applied Voltages. II. Modified Poisson-Nernst-Planck Equations", Physical Review E, vol. 75, 021503, 2007, pp. 1 to 11, US.
S. Das et al., "Steric-Effect-Induced Enhancement of Electrical-Double-Layer Overlapping Phenomena", Physical Review E, vol. 84, 012501, 2011, pp. 1 to 4, US.
A. Labuda et al., "Stochastic Noise in Atomic Force Microscopy", Physical Review E, vol. 86, 031104, 2012, pp. 1 to 18, US.
A. Labuda et al., "Stochastic Simulation of Tip-Sample Interactions in Atomic Force Microscopy", Applied Physics Letters, vol. 101, 113105, 2012, pp. 1 to 4, US.
J. Wang et al., "Structure, Energetics, and Dynamics of Water Adsorbed on the Muscovite (001) Surface: A Molecular Dynamics Simulation", Journal of Physical Chemistry B, vol. 109, 2005, pp. 15893 to 15905, US.
A Labuda et al., "Switching Atomic Friction by Electrochemical Oxidation", Langmuir, vol. 27, 2011, pp. 2561 to 2566, US.
M. Graham et al., "The Interface Between Au(111) and an Ionic Liquid", Electrochimica Acta, vol. 55, 2010, pp. 5212 to 6217.

M. Gnahm et al., "The Interface Between Au(100) and 1-butyl-3-methyl-imidazolium-hexafluorophosphate", Physical ahemistry Chemical Physics, vol. 13, 2011, pp. 11627 to 11633.
A. Labuda et al., "The Noise of Coated Cantilevers", Nanotechnology, vol. 23, 025503, 2012, pp. 1 to 9.
T. Fukuma et al., "True Molecular Resolution in Liquid by Frequency-Modulation Atomic Force Microscopy", Applied Physics Letters, vol. 86, 193108, 2005, pp. 1 to 3, US.
U. Rabe et al., "Vibrations of Free and Surface-Coupled Atomic Force Microscope Cantilevers: Theory and Experiment", Review of Scientific Instruments, vol. 67, 1996, pp. 3281 to 3293, US.
Y. Zhu et al., "Viscosity of Interfacial Water", Physical Review Letters, vol. 87, No. 9, 096104, 2001, pp. 1 to 4, US.
A. Labuda et al., "Method for Optimizing the Signal to Noise Ratio of Optical Beam Deflection Systems and Apparatus Thereof", U.S. Appl. No. 61/431,596, 2011.
M. Tur et al., "Source-Induced Noise in Optical Systems Driven by Low -Coherence Sources", Journal of Lightwave Technology, vol. 8, No. 2, 1990, pp. 183 to 189.
E Cartlidge, "Water's Mysteries Explained", New Scientist, vol. 205, 2746, 2010, pp. 32 to 35.
A. Labuda et al., "High-Resolution Friction Force Microscopy Under Electrochemical Control", Review of Scientific Instruments, vol. 81, 083701, 2010, pp. 1 to 11, US.
K. Kimura et al., "Visualizing water molecule distribution by atomic force microscopy", The Journal or Chemical Physics, vol. 132, 194705, 2010, pp. 1 to 5, US.
J.-K. Chang et al., "Pseudocapacitive Mechanism of Manganese Oxide in 1-Ethyl-3-methylimidazolium Thiocyanate Ionic Liquid Electrolyte Studied Using X-ray Photoelectron Spectroscopy", Langmuir, vol. 29, No. 19, 2009, pp. 11955 to 11960, US.
K. Kobayashi et al., "Reduction of Frequency Noise and Frequency Shift by Phase Shifting Elements in Frequency Modulation Atomic Force Microscopy ", Review of Scientific Instruments, vol. 82, 033702, 2011, pp. 1 to 9, US.
Y. Hosokawa et al., "A Procedure to Determine the Optimum Imaging Parameters for Atomic/Molecular Resolution Frequency Modulation Atomic Force Microscopy", Review of Scientific Instruments, vol. 81, 093701, 2010, pp. 1 to 4, US.
"Asylum Research Cypher TM Atomic Force Microscope Achieves Point Defect Atomic Resolution in Liquids", Asylum Research AFM News Press release, Apr. 28, 2011 (https://web.archive.org/web/20110604122932/http:/www. asylumresearch.com/News/News.shtml#PointDefects).
S. Morita et al., "Non-Contact Atomic Force Microscopy, NanoScience and Technology", Springer Physics and Astronomy online library, vol. 1, 439 pp., DE.
A. Labuda et al., "Decoupling Conservative and Dissipative Forces in Frequency Modulation Atomic Force Microscopy", Physical Review B, vol. 84. 125433, 2011, pp. 1 to 11, US.
J. E. Sader et al., "Coupling of Conservative and Dissipative Forces in Frequency-Modulation Atomic Force Microscopy", Physical Review B, vol. 74, 195424, 2006, pp. 1 to 4, US.
K. Kobayashi et al., "Reduction of Frequency Noise and Frequency Shift by Phase Shifting Elements in Frequency Modulation Atomic Force Microscopy", Review of Scientific Instrument, vol. 82, 033702, 2011, pp. 1 to 9, US.
F. J. Giessibl, "A Direct Mthod to Calculate Tip-Sample Forces From Frequency Shifts in Frequency-Modulation Atomic Force Microscopy", Applied Physics Letters, vol. 78, No. 1, 2001, pp. 123 to 125, US.
K. B. Oldham, "A Gouy-Chapman-Stern Model of the Double Layer at a (Metal)/(lonic Liquid) Interface", Journal of Electroanalytical Chemistry, vol. 613, 2008, pp. 131 to 138, CA.
A. Labuda et al, " Retrofitting an Atomic Force Microsope with Photothermal Excitation for a Clean Cantilever Response in Low Q Environments", Review of Scientific Instruments, vol. 83, 053703, 2012, pp. 1 to 8, US.
G.B. Kaggwa et al, "Artifact-Free Dynamic Atomic Force Microscopy Reveals Monotonic Dissipation for a Simple Confined Liquid", Applied Physics Letters, vol. 93, 011909, 2008, pp. 1 to 3, US.
A. Labuda et al., "Atomic Force Microscopy in Viscous Ionic Liquids", Langmuir, vol. 28, 2012, pp. 5319 to 5322, US.

(56) References Cited

OTHER PUBLICATIONS

T. Fukuma et al, "Atomic-Scale Distribution of Water Molecules at the Mica-Water Interface Visualized by Three-Dimensional Scanning Force Microscopy", Physical Review Letters, vol. 104, 016101, 2010, pp. 1 to 4, US.
S.J. O'Shea, "Comment on "Oscillatory Dissipation of a Simple Confined Liquid"", Physical Review Letters, vol. 97, 179601, 2006, p. 1, US.
A. Labuda et al., "Comparison of Photothermal and Piezoacoustic Excitation Methods for Frequency and Phase Modulation Atomic Force Microscopy in Liquid Environments", AIP Advances, vol. 1, 022136, 2011, pp. 1 to 17, US.
L. Cheng et al., "Molecular-Scale Density Oscillations in Water Adjacent to a Mica Surface", Physical Review Letters, vol. 87, No. 15, 2001, pp. 156103-1 to 156103-4, US.
C.D.F. Honig et al., "Correlations between the thermal vibrations of two cantilevers: Validation of Deterministic Analysis via the Fluctuation-Dissipation Theorem", Applied Physics Letters, vol. 100, 053121, 2012, pp. 1 to 3, US.
M.Z. Bazant et al., "Double Layer in Ionic Liquids: Overscreening Versus Crowding", Physical Review Letters, vol. 106, 046102, 2011, pp. 1 to 4, US.
M. Sha et al., "Double-Layer Formation of [Bmim][PF6] Ionic Liquid Triggered by Surface Negative Charge", Langmuir, vol. 26, 2010, pp. 12667 to 12672, US.
A.A. Kornyshev, "Double-Layer in Ionic Liquids: Paradigm Change?", Journal of Physical Chemistry, vol. 111, 2007, pp. 5545 to 5557, US.
S.H. Khan et al., "Dynamic Solidification in Nanoconfined Water Films", Physical Review Letters, vol. 105, 106101, 2010, pp. 1 to 4, US.
B.E. Conway, "Electrochemical Supercapacitors—Scientific Fundamentals and Technological Applications", Springer Science + Business Media, 1999, New York, 698 pages, US.
T. Oyama et al., "EQCM Study of the [AullICl4]—[AulCl2]—Au(0) Redox System in 1-Ethyl-3-methylimidazolium Tetrafluoroborate Room-Temperature Ionic Liquid", Langmuir, vol. 26, 2010, pp. 9069 to 9075, US.
Y. Leng et al., Erratum: "Hydration Structure of Water Confined Between Mica Surfaces", The Journal of Chemical Physics, vol. 124, 074711, 2006, p. 219907-1, US.
A. Labuda et al., "Exploiting Cantilever Curvature for Noise Reduction in Atomic Force Microscopy", Review of Scientific Instruments, vol. 82, 013704, 2011, pp. 1 to 6, US.
Y. Leng et al., "Fluidity of Hydration Layers Nanoconfined between Mica Surfaces", Physical Review Letters, vol. 94, 026101, 2005, pp. 1 to 4, US.
U. Raviv et al., "Fluidity of Water Confined to Subnanometre Films", Letters to Nature, vol. 413, 2001, pp. 51 to 54, US.
J.E. Sader, "Frequency Response of Cantilever Beams Immersed in Viscous Fluids with Applications to the Atomic Force Microscope", Journal of Applied Physics, vol. 84, No. 1, 1998, pp. 64 to 76, US.
A. Malani et al., "Influence of Hydrophilic Surface Specificity on the Structural Properties of Confined Water", The Journal of Physical Chemistry, vol. 113, 2009, pp. 13825 to 13839, US.
C. Sendner et al., "Interfacial Water at Hydrophobic and Hydrophilic Surfaces: Slip, Viscosity, and Diffusion", Langmuir, vol. 25, 2009, pp. 10768 to 10781, US.
T. Cremer et al., "Liquid/Solid Interface of Ultrathin Ionic Liquid Films: [C1C1 lm][Tf2N] and [C8C1lm][Tf2N] on Au (111)", Langmuir, vol. 27, 2011, pp. 3662 to 3671, US.
M. Watkins et al., "Mechanism of Contrast Formation in Atomic Force Microscopy in Water", Physical Review Letters, vol. 105, 196101, 2010, pp. 1 to 4, US.
S.D. Beer et al., "Non-Monotonic Variation of Viscous Dissipation in Confined Liquid Films: A Reconciliation", Europhysics Letters, vol. 97, 46001, 2012, pp. 1 to 6, EP.
R. Atkin et al., "An in situ STM/AFM and Impedance Spectroscopy Study of the Extremely Pure 1-butyl-methylpyrrolidinium tris(pentafluoroethyl)trifluorophosphate/Au(111) Interface: Potential Dependent Solvation Layers and the Herringbone Reconstruction", Physical Chemistry Chemical Physics, vol. 13, 2011, pp. 6849 to 6857, UK.
R. Hayes et al., "Double Layer Structure of Ionic Liquids at the Au(111) Electrode Interface: An Atomic Force Microscopy Investigation", The Journal of Physical Chemistry, vol. 115, 2011, pp. 6855 to 6863, US.
M. V. Fedorov et al, "Towards Understanding the Structure and Capacitance of Electrical Double Layer in Ionic Liquids", Electrochimica Acta, vol. 53, 2008, pp. 6835 to 6840.
M. Trulsson et al., "Differential Capacitance of Room Temperature Ionic Liquids: The Role of Dispersion Forces", The Journal of Physical Chemistry Letters, vol. 1, 2010, pp. 1191 to 1195, US.
L.E. Barrosse-Antle et al., "Voltammetry in Room Temperature Ionic Liquids: Comparisons and Contrasts with Conventional Electrochemical Solvents.", Chemistry an Asian Journal, vol. 5, 2010, pp. 202 to 230.
S. Baldelli, "Surface Structure at the Ionic Liquid-Electrified Metal Interface", Accounts of Chemical Research, vol. 11, No. 3, 2008, pp. 421 to 431, US.
Y.-Z. Su et al, "Double Layer of Au(100)/Ionic Liquid Interface and Its Stability in Imidazolium-Based Ionic Liquids", Angewandte Chemie (International Ed. in English), vol. 48, 2009, pp. 5148 to 5151.
M. Gnahm et al., "The Purification of an Ionic Liquid", Journal of Electroanalytical Chemistry, vol. 651, 2011, pp. 250 to 252.
M.C. Kroon et al., "Decomposition of Ionic Liquids in Electrochemical Processing", Green Chemistry, vol. 8, 2006, pp. 241 to 245.
L.G. Lin et al., "An in situ STM Study on the Long-Range Surface Restructuring of Au(111) in a Non-Chloroaluminumated Ionic Liquid", Electrochemistry communications, vol. 5, 2003, pp. 995 to 999.
X. Zhang et al., "Probing Double Layer Structures of Au (111)—BMIPF6 Ionic Liquid Interfaces from Potential-Dependent AFM Force Curves", Chemical Communications, vol. 48, 2012, pp. 582 to 584.
O. Mao et al., "A Simple Method to Determine the Purity of an Inert Gas", Review of Scientific Instruments, vol. 68, 1997, pp. 2438 to 2441, US.
T. Pajkossy et al., "The Interfacial Capacitance of Au(100) in an Ionic Liquid, 1-butyl-3-methyl-imidazolium hexafluorophosphate", Electrochemistry Communications, vol. 13, 2011, pp. 284 to 286.
M. Hegner et al., "Ultralarge Atomically Flat Template-Stripped Au Surfaces for Scanning Probe Microscopy", Surface Science, vol. 291, 1993, pp. 39 to 46.
J. Vatamanu et al, "On the Influence of Surface Topography on the Electric Double Layer Structure and Differential Capacitance of Graphite/Ionic Liquid Interfaces", The Journal of Physical Chemistry Letters, vol. 2, 2011, pp. 2267 to 2272.
A. Labuda et al., "Optical Detection System for Probing Cantilever Deflections Parallel to a Sample Surface", Review of Scientific Instruments, vol. 82, 013701, 2011, pp. 1 to 4, US.
A. Maali et al., "Oscillatory Dissipation of a Simple Confined Liquid", Pshysical Review Letters, vol. 96, 086105, 2006, pp. 1 to 4, US.
S. Baldelli, "Probing Electric Fields at the Ionic Liquid-Electrode Interface Using Sum Frequency Generation Spectroscopy and Electrochemistry", The Journal of Physical Chemistry B Letters, vol. 109, No. 27, 2005, pp. 13049 to 13051, US.
D. Kiracofe et al., "Quantitative Force and Dissipation Measurements in Liquids Using Piezo-Excited Atomic Force Microscopy: a Unifying Theory", Nanotechnology, vol. 22, 485502, 2011, pp. 1 to 11.
Y. Lauw et al., "Room-Temperature Ionic Liquids: Excluded Volume and Ion Polarizability Effects in the Electrical Double-Layer Structure and Capacitance", Physical Review Letters, vol. 103, 117801, 2009, pp. 1 to 4, US.

\* cited by examiner

Figure 5A

METHODS AND SYSTEMS FOR OPTIMIZING FREQUENCY MODULATION ATOMIC FORCE MICROSCOPY

CROSS REFERENCE TO RELATED APPLICATIONS

This patent application claims the benefit of U.S. Provisional Patent Application U.S. 61/609,994 filed Mar. 13, 2012 entitled "Methods and Systems for Optimizing Frequency Modulation Atomic Force Microscopy", the entire contents of which are included by reference.

FIELD OF THE INVENTION

The present invention relates to atomic force microscopy (AFM) and in particular to frequency modulation atomic force microscopy.

BACKGROUND OF THE INVENTION

Atomic force microscopy (AFM) or scanning force microscopy (SFM) is a very high-resolution type of scanning probe microscopy, with demonstrated resolution on the order of fractions of a nanometer, more than 1000 times better than the optical diffraction limit. Accordingly over the past 30 years the AFM has become one of the foremost tools for imaging, measuring, and manipulating matter at the nanoscale level. The information is gathered by "feeling" the surface with a mechanical probe wherein piezoelectric elements facilitate tiny but precise movements under computer control. In some AFM variations electric potentials can also be scanned using conducting cantilevers whilst in others electrical currents are passed through the AFM tip to probe the electrical conductivity of the sample being characterized or manipulate atoms upon the underlying surface.

A frequency modulation atomic force microscope (FM-AFM) exploits a microscopic cantilever, with a sharp tip, which is oscillated above the surface of the sample being characterised. The interaction between this cantilever with the sample surface causes the resonance frequency of the cantilever to shift, which is detected via an FM demodulator and allegedly track the surface structure of the sample. The detected resonant frequency shift is then used via feedback loop to keep the cantilever oscillating at its resonant frequency and at constant amplitude. This technique facilitates the use of high Q cantilevers without restricting the bandwidth or the dynamic range of the technique. FM-AFM is typically used in ultra-high vacuum but has been reported within liquids as well. The FM-AFM method allows the measurement of forces with picoNewton (pN) resolution, as well as imaging and manipulating matter with sub-nanometer resolution.

Within the prior art energy dissipation measurements have been identified as both a complementary tool in FM-AFM and as providing additional information with respect to the FM-AFM technique for dynamic force measurement, see for example H. Hölscher et al in "Measurement of Conservative and Dissipative Tip-Sample Interaction Forces with a Dynamic Force Microscope using the Frequency Modulation Technique" (Phys. Rev. B, Vol. 64, No. 7, 075402, 6 pages) and P. M. Hoffmann et al in "Energy Dissipation in Atomic Force Microscopy and Atomic Loss Processes" (Phys. Rev. Lett. 87, 265502, 4 pages). However, to date the technique has generally not fulfilled expectations. Numerous theories have been developed for the interpretation of FM-AFM data, including S. Morita et al in "Non-Contact Atomic Force Microscopy—Volume 1" (Springer-Verlag), Hölscher and Hoffmann.

However, to date the unexplained variability in experimental data has prevented progress in AFM based energy dissipation studies and associated scientific insights and has led to many questions and controversies. The inventors have established that a significant source of the variability is the parasitic hardware resonances within the AFM which have been previously overlooked in the interpretation of dissipation data. The inventors have demonstrated that these unwanted resonances can change not only the quantitative but also the qualitative interpretation of dissipation data. Accordingly the inventors have been able to reconcile the discrepancies between predictions and experimental results. The inventors detailed analysis of FM-AFM demonstrates that drawing robust conclusions from dissipation experiments requires an accurate measurement of the transfer function of the piezoacoustic excitation system $\aleph$ used to oscillate the cantilever. Omitting this measurement can lead to false interpretation of changes in the drive signal which relate to the physics of the FM-AFM system being considered to be those arising from the tip-sample physics.

Previously the inventors, in "Decoupling Conservative and Dissipative Forces in Frequency Modulation Atomic Force Microscopy" (Phys. Rev. B, Vol. 84. 125433, 2011), discussed the different types of AFM studies that have thus far potentially been misinterpreted. Experiments and theoretical calculations of conservative forces measured by frequency modulation atomic force microscopy (FM-AFM) in vacuum within the prior art are generally in reasonable agreement. However, this contrasts with dissipative forces, where experiment and theory within the prior art often disagree by several orders of magnitude. The inventors demonstrated that the frequency response of the piezoacoustic cantilever excitation system, traditionally assumed flat, can actually lead to surprisingly large apparent damping by the coupling of the frequency shift to the drive-amplitude signal, typically referred to as the "dissipation" signal. Accordingly the large quantitative and qualitative variability observed in dissipation spectroscopy experiments, contrast inversion at step edges and in atomic-scale dissipation imaging, as well as changes in the power-law relationship between the drive signal and bias voltage in dissipation spectroscopy can be predicted. The magnitude of apparent damping can escalate by more than an order of magnitude at cryogenic temperatures.

Accordingly it would be beneficial for there to be a means of correcting this source of apparent damping allowing dissipation measurements to be reliably and quantitatively compared to theoretical models. It would be further beneficial for this method to be non-destructive and both easily and routinely integrated into FM-AFM measurements. According to embodiments of the invention a methodology is presented that can be directly implemented into standard AFM experimental protocols.

Other aspects and features of the present invention will become apparent to those ordinarily skilled in the art upon review of the following description of specific embodiments of the invention in conjunction with the accompanying figures.

SUMMARY OF THE INVENTION

It is an object of the present invention to mitigate disadvantages in the prior art for atomic force microscopy (AFM) and in particular to frequency modulation atomic force microscopy.

In accordance with an embodiment of the invention there is provided a method comprising:
providing an atomic force microscope comprising at least a cantilever and a distance controller;
applying a bias voltage to the cantilever;
reducing the distance between the cantilever and a sample with the distance controller; wherein
errors introduced into energy dissipation measurements arising from a piezoacoustic excitation transfer function between the cantilever and the sample are reduced.

In accordance with an embodiment of the invention there is provided a method comprising:
providing an atomic force microscope, wherein providing the atomic force microscope comprises at least:
providing a cantilever;
providing a sample mount coupled to a distance controller;
providing at least one of an amplitude controller and a phase controller, the at least one of providing a drive signal to the cantilever;
providing at least one of an amplitude measurement system and a phase measurement system;
measuring a frequency shift caused by an interaction between cantilever and a sample mounted to the sample holder with the at least one of an amplitude controller and a phase controller, the frequency shift relating to the drive signal applied to the cantilever; and
reducing errors in tracking the frequency shift caused by the interaction between the cantilever and the sample by feeding forward a correction signal derived in dependence upon at least the measured frequency shift during making measurements on the sample.

In accordance with an embodiment of the invention there is provided a method comprising:
performing transfer function measurements at a constant predetermined amplitude with a cantilever on a sample by employing an amplitude controller that reduces the effects of non-linearities within the cantilever-sample system as well as convolution effects due to the finite response time of the cantilever-sample system.

In accordance with an embodiment of the invention there is provided a method comprising:
using measurements of a piezoacoustic excitation system transfer function within a cantilever based measurement system to establish a frequency dependent phase offset;
feeding forward a correction signal with a phase controller to maintain the cantilever in resonance, the correction signal determined in dependence upon at least the frequency dependent phase offset.

In accordance with an embodiment of the invention there is provided a method comprising:
deriving at least one aspect of a plurality of aspects, each aspect relating to a piezoacoustic excitation system transfer function of a resonant cantilever based measurement system;
recovering at least one of an amplitude component and a phase component of a cantilever transfer function, the at least one of determined in dependence upon the at least one aspect;
determining a characteristic of the resonant cantilever in dependence upon the at least one of the amplitude component and the phase component of the cantilever transfer function.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein.

DETAILED DESCRIPTION

The present invention is directed to atomic force microscopy (AFM) and in particular to frequency modulation atomic force microscopy.

The ensuing description provides exemplary embodiment(s) only, and is not intended to limit the scope, applicability or configuration of the disclosure. Rather, the ensuing description of the exemplary embodiment(s) will provide those skilled in the art with an enabling description for implementing an exemplary embodiment. It being understood that various changes may be made in the function and arrangement of elements without departing from the spirit and scope as set forth in the appended claims.

This invention pertains to a method and device which performs an automated and accurate measurement of the transfer function of the piezoacoustic excitation system $\aleph$ of a frequency modulation atomic force microscope (FM-AFM). This measurement of $\aleph$ is then used to calibrate the FM-AFM signals (drive amplitude and frequency shift) into a dissipation measurement.

As discussed by A. Labuda et al in "Comparison of Photothermal and Piezoacoustic Excitation Methods for Frequency and Phase Modulation Atomic Force Microscopy in Liquid Environments" (AIP Advances, Vol. 1, Iss 2, 17 pages) the benefits of FM-AFM over amplitude modulation AFM (AM-AFM) in vacuum are clear since not only is the response time greatly improved, but the conservative and dissipative forces are decoupled because the cantilever is always driven at its natural frequency, which also maintains the signal-to-noise ratio (SNR) at its maximum throughout the experiment. In the ideal situation, the conservative interaction between the cantilever tip and the sample is directly related to the shift in the self-excitation frequency, while the interaction damping is directly related to the drive amplitude of an automatic-gain-controller (AGC) which maintains a constant cantilever amplitude.

In reality, this assumption is flawed for FM-AFM measurements in liquid, air, and vacuum environments. Labuda et al in "Comparison of Photothermal and Piezoacoustic Excitation Methods for Frequency and Phase Modulation Atomic Force Microscopy in Liquid Environments" (AIP Advances, Vol. 1, Iss 2, 17 pages)", has demonstrated a method of correcting this problem in FM-AFM in liquid environments whilst Proksch et al in "Energy Dissipation Measurements in Frequency-Modulated Scanning Probe Microscopy" (Nanotech., Vol. 21, 455705) have shown a method of correcting this problem in air environments. However, these methods fail in vacuum environments because the thermal noise of the cantilever is difficult to measure accurately and the dynamic range is very high for both the cantilever transfer function and the piezoacoustic excitation transfer function. Accordingly, the inventors have established a method that allows for an accurate measurement of the piezoexcitation method in vacuum environments by overcoming these problems.

Figure 1:
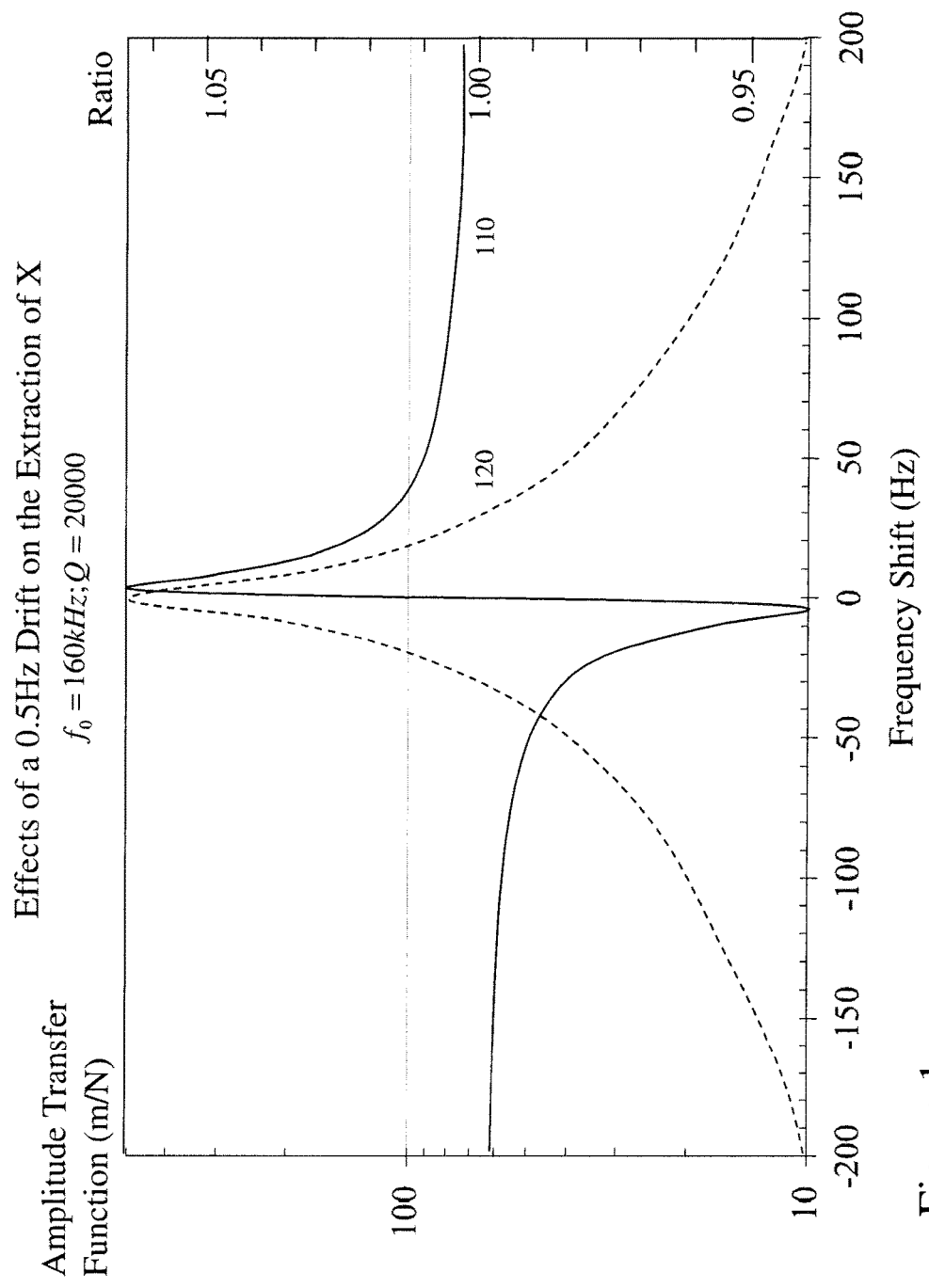
FIG. 1 depicts the effect of 0.5 Hz drift of the cantilever resonance frequency on the extraction of the piezoacoustic excitation system transfer function, $\aleph$.

Amongst the multiple error sources present within measurements of the piezoacoustic excitation system transfer function, $\aleph$, of the FM-AFM system is the frequency drift of the cantilever resonance frequency itself during the measurement of N, as this distorts the measured piezoacoustic excitation system transfer function, $\aleph$. Referring to FIG. 1 the effects of a 0.5 Hz drift in the cantilever resonance frequency are presented wherein the recovered transfer function, $\aleph$, is shown as a function of frequency shift frequency offset from the cantilever resonance frequency. As shown the piezoacoustic excitation system transfer function, $\aleph$, is within 1.00±0.01 outside ±50 Hz from the cantilever center frequency but varies rapidly between approximately 0.94 and approximately 1.06 within ±50 Hz and if fact transitions from approximately 0.94 at −5 Hz offset to and approximately 1.06 at +5 Hz offset.

Figure 2:
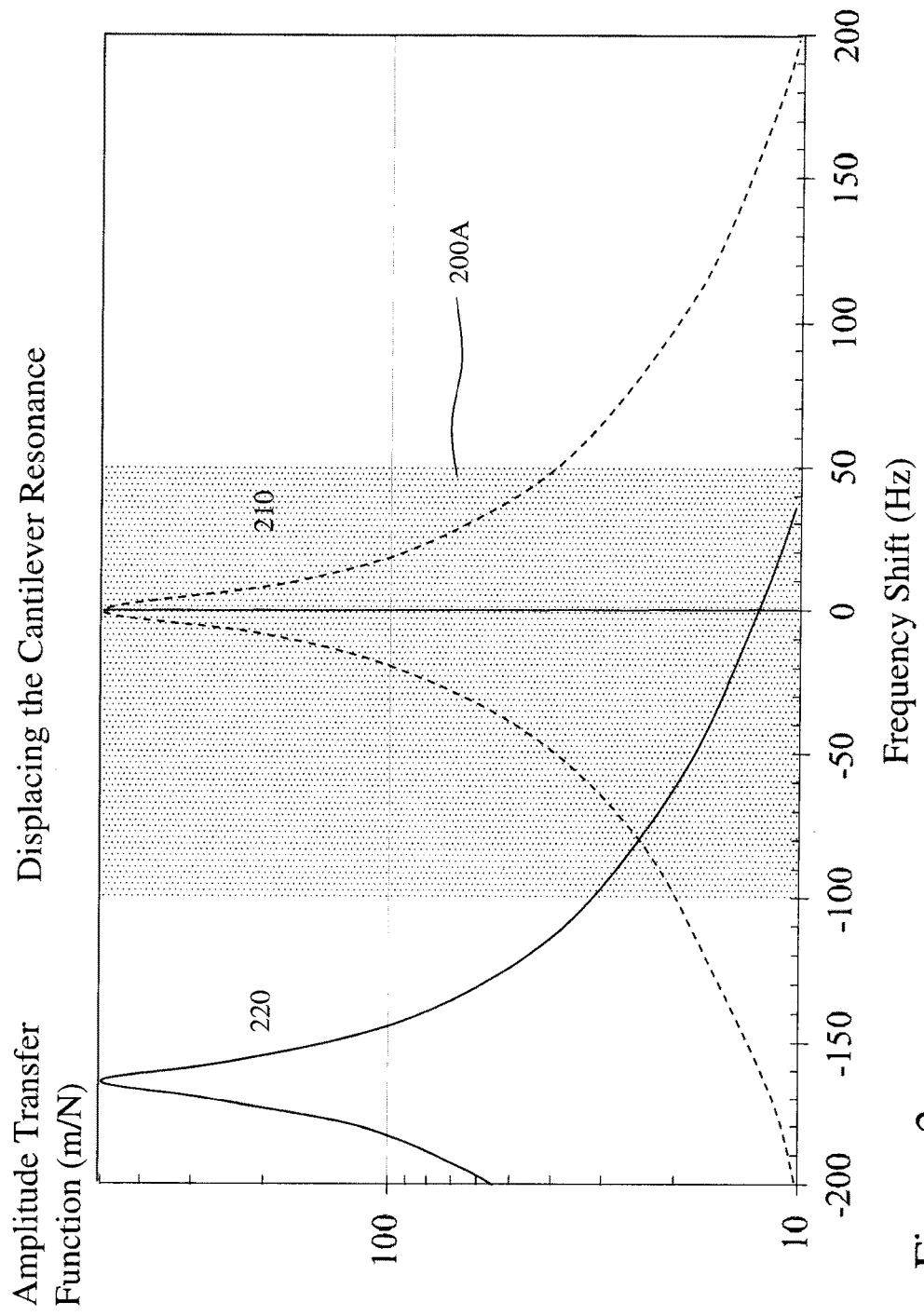
FIG. 2 depicts the effect of offsetting the cantilever resonance frequency according to an embodiment of the invention.

As noted the frequency drift may arise for many reasons, such as thermal drift of the cantilever, or drift in the frequency reference of the electronics for example. However, as noted above and evident from FIG. 1 the error in estimating $\aleph$ 110 occurs predominantly around the cantilever resonance frequency, i.e. the peak of the transfer function $\aleph \Im_{P4}$ 120. However, the impact of this frequency drift can be reduced by applying a bias voltage between the cantilever and the sample being characterised, and by bringing the cantilever tip to the sample until the resonance frequency shifts outside the frequency range of interest, as represented in FIG. 2. For example, if the frequency shift range of interest was, say region 200A between [−100 Hz, +50 Hz] with first transfer function $\aleph \Im_{P4}$ 210, then as evident from FIG. 1 small frequency offsets would yield significant variations in the estimated $\aleph$ within this frequency range of region 200A. However, if the cantilever resonance was shifted to below −150 Hz as depicted by second transfer function $\aleph \Im_{P4}$ 220 then the resulting impact in the estimated $\aleph$ is significantly reduced.

However, a new source of drift is now created, because the shifted resonance frequency is now a function of the tip-sample distance. Accordingly due to thermal drift and physical creep of the mechanical positioners, the shifted cantilever resonance frequency is prone to this new source of frequency drift arising from tip-sample drift. Within the following specification two methods, pertaining to different hardware configurations, are presented that correct for this problem.

The first protocol, referred to as the "True Dissipation" protocol, measures the transfer function, $\aleph$, on a simple AFM system whilst reducing the effect of frequency drift and tip-sample drift. The frequency drift is corrected through a protocol consisting of applying a bias voltage, approaching the sample, and then using a feed-forward method to prevent tip-sample drift from causing additional frequency drift. In other words, the tip-sample drift is measured for a certain period of time before the measurement of the transfer function $\aleph$ and then compensated during the measurements to minimize the effects of tip-sample drift.

The second protocol, referred to as the "Drift Free True Dissipation" protocol is a simpler and more accurate implementation of the protocol; however it requires an additional hardware component to implement an additional feedback loop that maintains a constant cantilever resonance frequency shift. This compensates for any frequency drift, and tip-sample drift, during the measurement of $\aleph$. In the meantime, a lock-in amplifier performs the measurement of $\aleph$ in the frequency range of interest.

Another aspect of the invention for improved accuracy in measuring $\aleph$ is to perform the transfer function measurement in constant amplitude mode. Accordingly, an amplitude controller maintains constant cantilever oscillation amplitude whilst the drive voltage amplitude varies. Accordingly, nonlinearities occurring in the tip-sample interaction during the measurement, or any finite response time convolution effects, cancel out when extracting the measurement of $\aleph$ from measurements performed using either of the protocols.

In addition to the advantages discussed above from utilizing one or other of the protocols according to embodiments of the invention, the measurement also provides for:

accurately tracking the cantilever resonance frequency during the FM-AFM experiment which arises as changes in the cantilever phase as a function of oscillation frequency can be predicted, and therefore compensated by the FM-AFM system which can maintain the cantilever on resonance throughout the experiment; and determining the true Q-factor of the cantilever by analysis the amplitude or the phase response of the cantilever transfer function. The true cantilever transfer function can only be measured accurately once the $\aleph$ is measured.

1. True Dissipation Protocol

The goal of the True Dissipation approach according to embodiments of the invention is to accurately record the excitation system transfer function $\aleph$ (f) across a frequency range defined by the user and to allow for accurate calibration of the drive amplitude for damping measurements. As discussed above the protocols exploit controlled offset of the cantilever resonance wherein the frequency shift range selected for the offset exceeds the range of frequency shifts recorded during the experiment.

Figure 3:
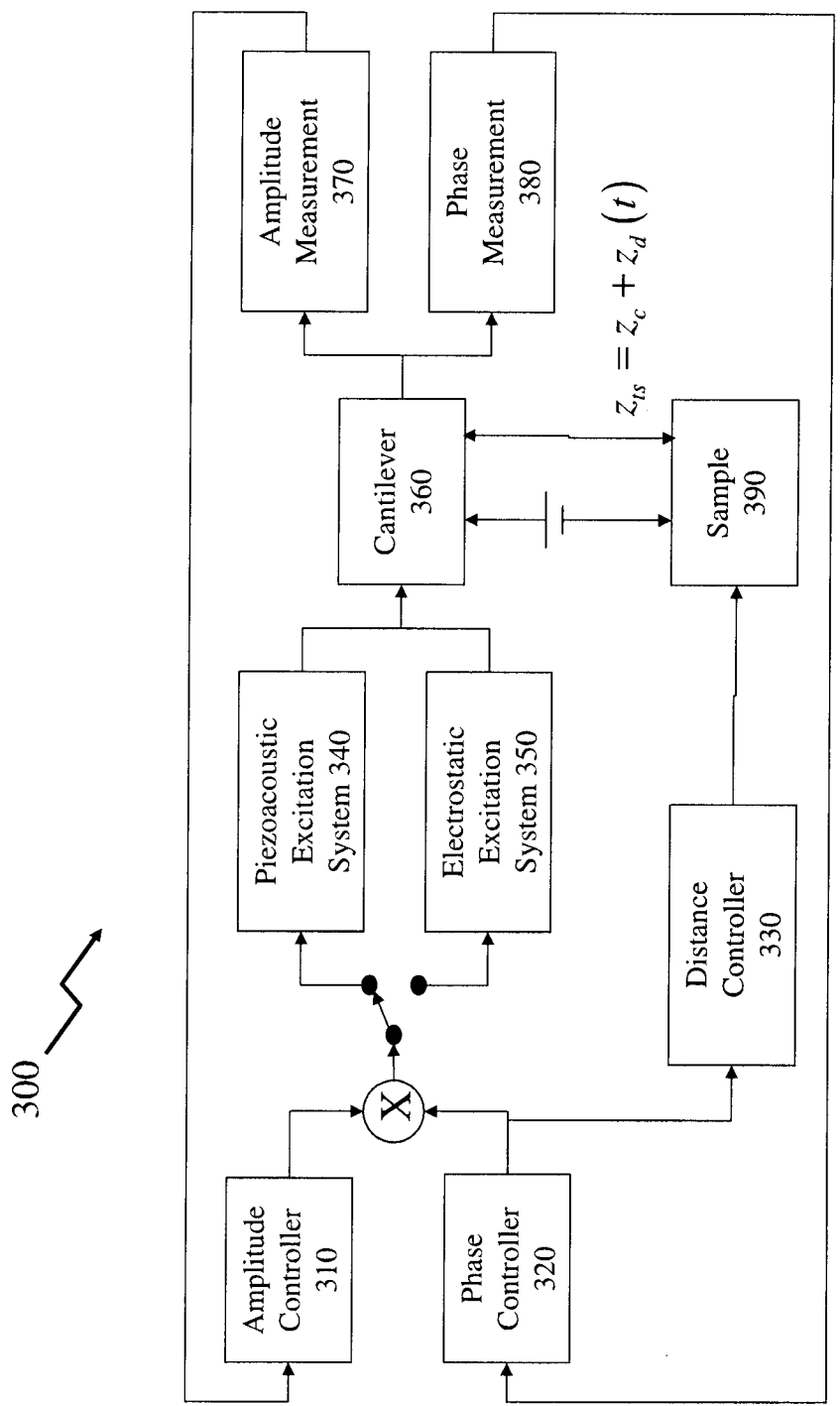
FIG. 3 depicts a system diagram of an FM-AFM system used in implementing a protocol according to an embodiment of the invention.

1.1 System Diagram:

Referring to FIG. 3 there is depicted a FM-AFM system 300 for an implementation of the "True Dissipation" protocol. As depicted FM-AFM system 300 comprises a Cantilever 360 performing measurements on a Sample 390 wherein the separation of the Cantilever 360 and Sample 390 is controlled through Distance Controller 330 which is coupled to Phase Controller 320. The Cantilever 360 is coupled to Amplitude Measurement 370 and Phase Measurement 380 elements which couple to Amplitude Controller 310 and Phase Controller 320 respectively. The outputs of these two elements being combined and selectively coupled to either a Piezoacoustic Excitation System 340 or Electrostatic Excitation System 350, each of which are coupled to the Cantilever 360 thereby completing the FM-AFM system 300.

Amplitude Controller 310 receives the measured cantilever oscillation amplitude $V_A$, as its input and outputs the drive voltage amplitude $V_D$. In closed-loop mode $A \circlearrowleft$ ($A_{set}$, $P_A, \tau_A$), where $A_{set}$ is the amplitude set point, $P_A$ the proportional gain, and $\tau_A$ the time constant. In direct-drive mode $A \curvearrowright (V_D)$ where $V_D$ is the drive voltage.

Phase Controller 320 receives the driven cantilever phase $\theta \aleph_C(f_{osc})$ and outputs the cantilever drive signal at $f_{osc}$ with phase offset $\theta_{ref}$. In closed-loop mode $F \circlearrowleft (\theta_{ref}, P_F, \tau_F)$ where $\theta_{ref}$ is the amplitude set point, $P_F$ the proportional gain, and $\tau_F$ the time constant. In frequency sweep mode $F \curvearrowright ([f_{min}, f_{max}], N_F, T_F)$ where $N_F$ is the number of data points and $T_F$ the averaging time per data point.

Distance Controller 330 receives as its input the frequency shift $\Delta f$ with respect to the unperturbed cantilever resonance $f_0$ and generates as its output the sample position $z_c$. In closed loop mode $Z \circlearrowleft (\Delta f_{set}, P_Z, \tau_Z)$ where $\Delta f_{set}$ is the frequency shift set point, $P_Z$ the proportional gain, and $\tau_Z$ the time constant. In feed-forward mode $Z \curvearrowright (z_c(t))$ where $z_c(t)$ is the position waveform whilst in retracted mode $Z \curvearrowright$ (retracted).

It is worth noting that the tip-sample distance $z_{ts}$, is proportional to the distance controller position $z_c$ and the tip-sample drift $z_d(t)$, as in $z_{ts} \propto z_c + z_d(t)$. The piezoacoustic excitation system transfer function $\aleph(f)$ is considered to be constant in time for the duration of the True Dissipation measurement. As noted above the impact of frequency drifts can be reduced by applying a bias voltage between the cantilever and through the tip-sample distance. Accordingly a bias voltage $V_b$ can be applied between the Cantilever 360 and the Sample 390.

The electrostatic excitation system transfer function $\aleph_{ES}(z_{ts})$ is approximated as frequency independent. However, it can change with time because its value depends on the tip-sample distance $z_{ts}$ which is time-dependent due to drift $z_d(t)$.

The cantilever transfer function $\Im^*(f, f_0^*(z_{ts}, V_b, t))$ is characterized by the perturbed resonance frequency $f_0^*(z_{ts}, V_b, t)$ of the cantilever. It is assumed that no tip-sample damping occurs during the True Dissipation measurement—i.e. the Q-factor remains constant, and the transfer function only translates in frequency space. This transfer function is time-dependent for two reasons: drift can cause the tip-sample distance $z_{ts}$ to change, or the $f_0^*$ drifts for various reasons such as temperature changes.

1.2 Noise Considerations:

The power spectral density of the transfer function measurements is given by $n_{TF}^2 = n_d^2(f) + n_A^2(f)$, where the $n_d^2(f)$ is the power spectral density of the amplitude detection system, and $n_A^2(f)$ is the power spectral density of the amplitude controller output. All noise densities have units of $Hz^{-1}$, as both power spectral densities are normalized by the square cantilever amplitude $V_A^2$ and the squared drive voltage $V_d^2$, respectively.

The noise $n_{TF}^2(f)$ can be empirically measured at a few frequencies within the frequency range of measurements in order to estimate the worst case $n_{TF}^2$ value, referred to as the relative intensity noise (RIN), which will be used to optimize the True Dissipation protocol from a "time versus signal-to-noise" consideration.

1.3 User Input:

An FM-AFM measurement system such as FM-AFM system 300 will typically operate under microprocessor control and provide the operator of the AFM with a user interface for controlling the measurements, storing measurements, etc. Accordingly the AFM user may wish to establish some configuration settings of the AFM themselves, perhaps to those previously established for measuring a previous sample or those reported/used by another research group or researcher. In other instances the AFM user may wish to have these settings set to a predetermined set of defaults including for example supplier defaults, a predetermined AFM configuration, and a previously stored user configuration. The parameters listed below in Table 1 are those, which according to embodiments of the invention with respect to the True Dissipation protocol may either be input by the user, retrieved from a configuration file, or calculated automatically by appropriate functions to optimize the performance of the protocol. It would be evident that other methods of setting such values may be employed including, but not limited, to iterating one or more settings based upon measurements of a calibration sample or a sample containing an element of known dimensions, physical property etc.

TABLE 1

| Parameters Which May Be Automatically Established or Set by User | | |
|---|---|---|
| Transfer Function Parameters | $\Delta f_{min}$ | Minimum frequency shift (negative) |
| | $\Delta f_{max}$ | Maximum frequency shift (positive) |
| | $N_F$ | Number of data points |
| | $T_F$ | Averaging time per data point |
| Cantilever Parameters | $A_{set}$ | Cantilever amplitude set point |
| | $f_0$ | Cantilever resonance frequency |
| | Q-factor | Cantilever Q-factor |
| System Parameters | $V_{b, max}$ | Maximum allowable bias voltage |
| SNR Optimization | $\Delta f_{add}$ | Additional frequency shift for displacing resonance |
| | $n_{TF}^2$ | Estimated relative intensity noise |
| | $T_{TD}$ | Total desired duration of the True Dissipation measurement |
| Drift Correction | $T_c$ | Settling time for creep reduction after tip-sample approach |
| | $T_d$ | Duration of the drift measurement |
| | p | Polynomial order for drift correction |
| Controller Parameters | $P_A$ | Proportional gain of amplitude controller |
| | $\tau_A$ | Time constant of amplitude controller |
| | $P_Z$ | Proportional gain of distance controller |
| | $\tau_Z$ | Time constant of distance controller |
| | $\tau_F^{-1}$ | Demodulation bandwidth of phase controller |
| | $P_F$ | Proportional gain of phase controller |
| | $\tau_F$ | Time constant of phase controller |

Figure 4:
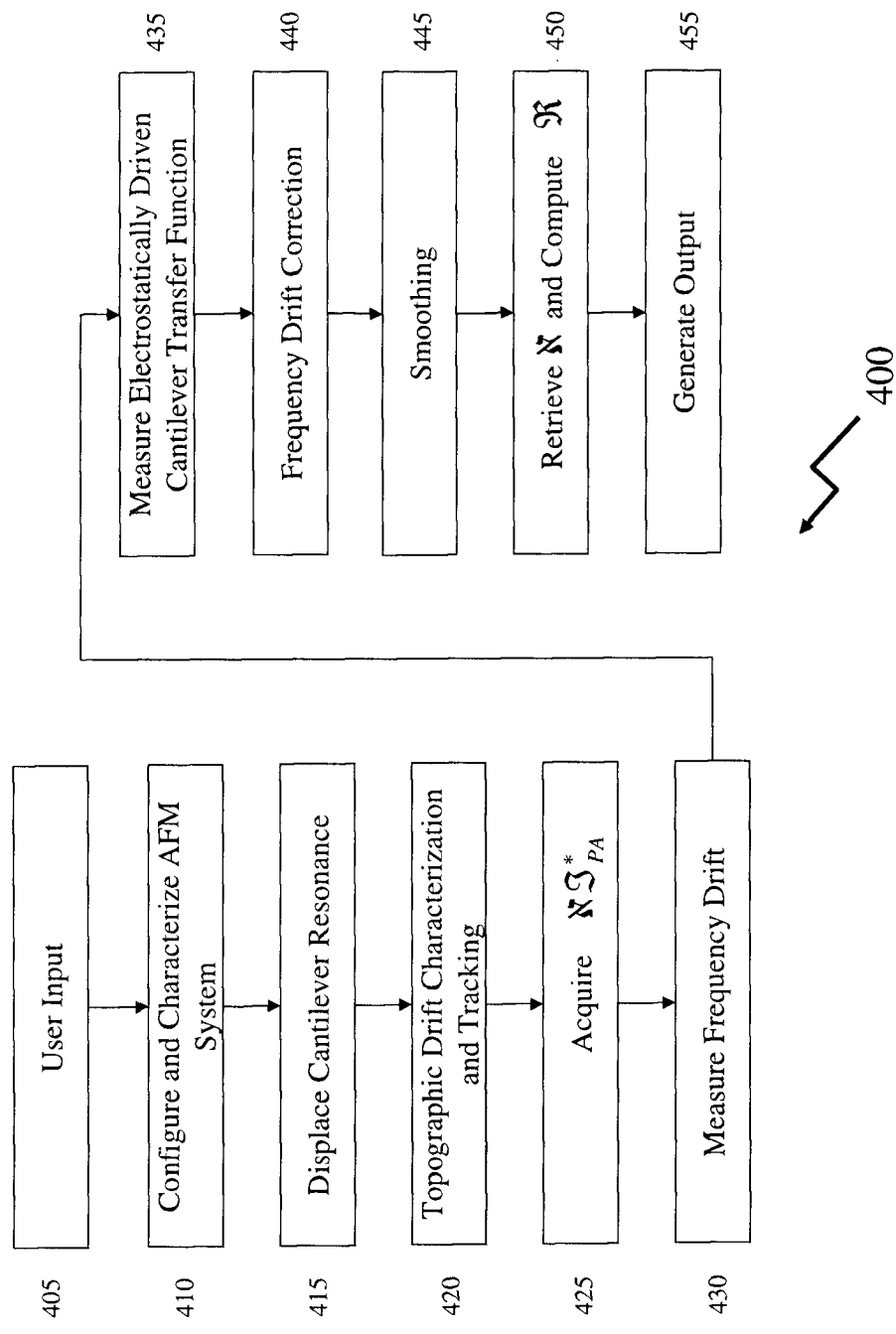
FIG. 4 depicts a flowchart according to an embodiment of the invention.

1.4 Protocol:

The True Dissipation protocol consists of a series of steps which establish the AFM, such as AFM system 300 in FIG. 3, into one or more predetermined configurations to obtain the required calibration, setting, and measurement data to provide the processing of the measured AFM data to derive the actual measurement data. Referring to FIG. 4 the True Dissipation protocol is shown as a process flow 400 comprising steps 405 through 455 which are listed in 1.4 User Input together with sections 1.5A through 1.5I below and the output data derivation outlined in section 1.6.

1.4A: Configure and Characterize AFM System:

The state of the AFM is set initially to $\{A \circlearrowleft (A_{set}, P_A, \tau_A); F \circlearrowleft (\theta_{ref}, P_F, \tau_F); Z \curvearrowright (\text{retracted}); V_b = 0; PA\}$, indicating the mode of operation of the amplitude, frequency, and distance controllers, the bias voltage setting (open circuit in this case), and activation where in this instance "PA" refers to piezoacoustic excitation. Accordingly $f_{osc}$ is swept to determine the $\aleph \Box (f)$ maximum, defined as the unperturbed cantilever resonance frequency $f_0$ (store) and the phase reference $\theta_f$ (store) which corresponds to the drive-minimization frequency. (Note: Within the specification parameters or values followed by "(store)" are items saved by the AFM for use in subsequent steps and/or data processing).

1.4B: Displace Cantilever Resonance:

The state of the AFM is now adjusted to $\{A \circlearrowleft (A_{set}, P_A, \tau_A); F \circlearrowleft (\theta_{ref}, P_F, \tau_F); Z^{\leadsto}(\text{retracted}); V_b = V_{b, max}; PA\}$ wherein the bias voltage is set to the maximum, $V_b = V_{b, max}$. Next the distance controller is engaged to approach the sample to the target set point, $\Delta f_{tar} = \Delta f_{min} + \Delta f_{add}$ thereby setting the AFM state to $\{A \circlearrowleft (A_{set}, P_A, \tau_A); F \circlearrowleft (\theta_{ref}, P_F, \tau_F); Z \circlearrowleft (\Delta f_{tar}, P_Z, \tau_Z); V_b = V_{b, max}; PA\}$.

At this point the perturbed resonance frequency is $f_0^* = f_0 + \Delta f_{min} + \Delta f_{add}$. The process then checks to see that $f_0^*$ has in fact been reached, and if it has not the process prompts the user. As noted above the perturbed resonance frequency $f_0^*$ is established outside the frequency range of measurements established by $\Delta f_{min}$ and $\Delta f_{max}$.

1.4C Topographic Drift Characterization and Tracking:

The AFM stages as discussed above being a mechanical and/or electromechanical system are prone to some creep which is normally small compared with the measurements in general microscopy but are comparable to those evaluated with an AFM. Accordingly, the True Dissipation protocol control process waits for the creep to settle for $T_c$ seconds and then tracks the drift $z_d$ (t) for a total duration of $T_d$ seconds. Next this drift $z_d$ (t) is fitted with an order p polynomial of the form $Z_{d,PA}(t) = c_0 + c_{1, PA} t + c_{2, PA} t^2 + \ldots, c_{p,CA} t^p$ wherein the coefficients $c_0, c_{1,PA}, \ldots, c_{p,PA}$ are stored. Accordingly the AFM initiates feed-forward to the state $\{A \circlearrowleft (A_{set}, P_A, \tau_A); F \circlearrowleft (\theta_{ref}, P_F, \tau_F); Z^{\leadsto}(-z_{d,PA}(t)); V_b = V_{b,max}; PA\}$.

1.4D Acquire: $\aleph \Im^*_{PA}$:

Acquire and store piezoacoustically driven cantilever transfer function $\aleph \Im^*_{PA}$ by placing the AFM into state $\{A \circlearrowleft (A_{set}, P_A, \tau_A); F^{\leadsto}([f_{min}, f_{max}], N_F, T_F); Z \Rightarrow (Z_{d,PA}(t)); V_b = V_{b,max}; PA\}$. The raw drive signal $V_{d,PA}(f)$ is also stored for future reference. Alternatively, this can be performed in constant-drive mode with drive amplitude $V_{d,PA}$ (store) such that the AFM is now in the state $\{A^{\leadsto}(V_{d,PA}); F^{\leadsto}([f_{min}, f_{max}], N_F, T_F); Z \Rightarrow (-z_{d,PA}(t)); V_b = V_{b,max}; PA\}$.

1.4E Measure Frequency Drift:

The AFM engages the phase controller feedback such that the AFM is now in the state $\{A \circlearrowleft (A_{set}, P_A, \tau_A); F^{\leadsto}(\theta_{ref}, P_F, \tau_F); Z \Rightarrow (-z_{d,PA}(t)); V_b = V_{b, max}; PA\}$. The drifted resonance frequency $f^*_{0-PA}$ is measured from which the frequency drift is calculated from $\delta f_{0,PA} = f^*_0 - f^*_{0-PA}$ (store). The AFM is then returned to the state with the target frequency shift $\{A \circlearrowleft (A_{set}, P_A, \tau_A); F \circlearrowleft (\theta_{ref}, P_F, \tau_F); Z \circlearrowleft (\Delta f_{tar}, P_Z, \tau_Z); V_b = V_{b,max}; PA\}$.

1.4F Measure Electrostatically Driven Cantilever Transfer Function:

Now the AFM is switched to electrostatic attraction and established to the state $\{A \circlearrowleft (A_{set}, P_A, \tau_A); F \circlearrowleft (\theta_{ref}, P_F, \tau_F); Z \circlearrowleft (\Delta f_{tar}, P_Z, \tau_Z); V_b = V_{b,max}, ES\}$ where "ES" denotes electrostatic excitation. Now the steps 1.5C, 1.5D, and 1.E are repeated for electrostatic drive with resulting $c_0, c_{1,ES}, \ldots, c_{p,ES}; \Im^*_{ES}$, and $\delta f_{0,ES}$ values being stored. Now the AFM retracts, returns to piezoacoustic excitation, and open-circuit bias potential thereby establishing the initial state $\{A \circlearrowleft (A_{set}, P_A, \tau_A); F \circlearrowleft (\theta_{ref}, P_F, \tau_F); Z^{\leadsto}(\text{retracted}); V_b = \phi; PA\}$.

1.4G Frequency Drift Correction:

The electrostatic transfer function should be "realigned" in frequency space with respect to the piezoacoustic transfer function by applying Equation (1). This ensure that drift is corrected more near $\Delta f = 0$ Hz than at $\Delta f = \Delta f_{min}$ $$\Im^*_{ES,corr}(f) = \Im^*_{ES}\left[\frac{\delta f_{0,PA}}{\delta f_{0,ES}} + f_c^{*\square} - \frac{\delta f_{0,PA}}{\delta f_{0,ES}}\right] \quad (1)$$

1.4H Smoothing:

The resulting transfer functions $\Im^*_{PA}$ and $\Im^*_{ES}$ are smoothed using an algorithm which is selected in dependence upon one or factors including but not limited to noise density $n_d$ and acquisition time $T_F$.

1.4I Retrieve $\aleph$ and Compute $\Re$:

The retrieved piezoelectric excitation transfer function is modified according to Equation (2) below.

$$\aleph = \frac{\aleph \Im^*_{PA}}{\Im^*_{ES}} \quad (2)$$

This is then normalized so that $|\aleph(f_0)| = 1$ and the phase $\theta$ $\aleph$ offset such that $\theta \aleph(f_0) = 90°$. Accordingly the drive amplitude signal calibration factor $\Re(f)$ established using Equation (3) below. Additional metadata relating to the measurement is stored in association with it including but not limited to, AFM user identity, AFM identity, AFM cantilever identity, sample identity, and date and time information. This data together with measurement data, including but not limited to, drive amplitude signal calibration factor $\Re(f)$, electrostatic and piezoacoustic excitation system transfer functions $\aleph_{ES}$ and $\aleph_{PA}$ respectively, raw electrostatic and piezoacoustic drive signals $V_{d,ES}$ and $V_{d,PA}$ respectively, and piezoelectric excitation transfer function $\aleph$. The results may be processed live or offline for a variety of reasons including, but not limited to, for display to the user and for calibration.

$$\Re(f) = \left|\frac{\sin(\theta_{\Im_s} - \theta_{\aleph(f)})}{\sin(\theta_{\Im_s})}\right|^{-1} \times |\aleph(f)|^{-1} \quad (3)$$

1.5 Generate Output:

Based upon the operation of the True Dissipation protocol discussed above multiple outputs are generated and stored by the AFM as listed below in respect of Table 2.

TABLE 2

List of Generated Outputs from True Dissipation Protocol

| | | |
|---|---|---|
| Values | $f_0$ | Cantilever resonance frequency |
| | $\theta_{Cs}$ | Starting phase of cantilever transfer function, when using the drive minimization method, generally $\theta_{Cs} \neq 90°$ |
| | $\theta_{ref}$ | Reference phase of controller corresponding to drive minimization criterion |
| | $\theta_{ref, new}$ | New reference phase of controller corresponding to cantilever resonance $\theta_{ref, new} = \theta_{ref} - \theta_{Cs} + 90°$ |
| | $\delta f_{0, PA}$ | Frequency shift during piezoacoustic transfer function measurement |
| | $\delta f_{0, ES}$ | Frequency shift during electrostatic transfer function measurement |
| Functions for Graphing | $|\aleph(f)|$ | amplitude component of $\aleph(f)$ - normalized at $f_0$ |
| | $\theta_\aleph(f)$ | amplitude component of $\aleph(f)$ - offset to $-90°$ normalized at $f_0$ |
| | $\alpha_\aleph(f)$ | Normalized slope of $|\aleph(f)|$; $\alpha_\aleph(f) = \frac{1}{|\aleph(f)|} \frac{\delta|\aleph(f)|}{\delta f}$ |
| | $\beta_\aleph(f)$ | Slope of $\theta_\aleph(f)$; $\beta_\aleph(f) = \frac{\delta|\aleph(f)|}{\delta f}$ |
| Post-Processing | $S_{PA}$ | Smoothing factor for piezoacoustic transfer function |
| | $S_{ES}$ | Smoothing factor for electrostatic transfer function |

TABLE 2-continued

List of Generated Outputs from True Dissipation Protocol

| Input | $S_{NE}$ | Smoothing factor for the final $\Re(f)$ calibration function |
|---|---|---|
| | $S_{NE}$ | Smoothing factor for the final $\alpha_R(f)$ and $\beta_R(f)$ functions |

Figure 5A:
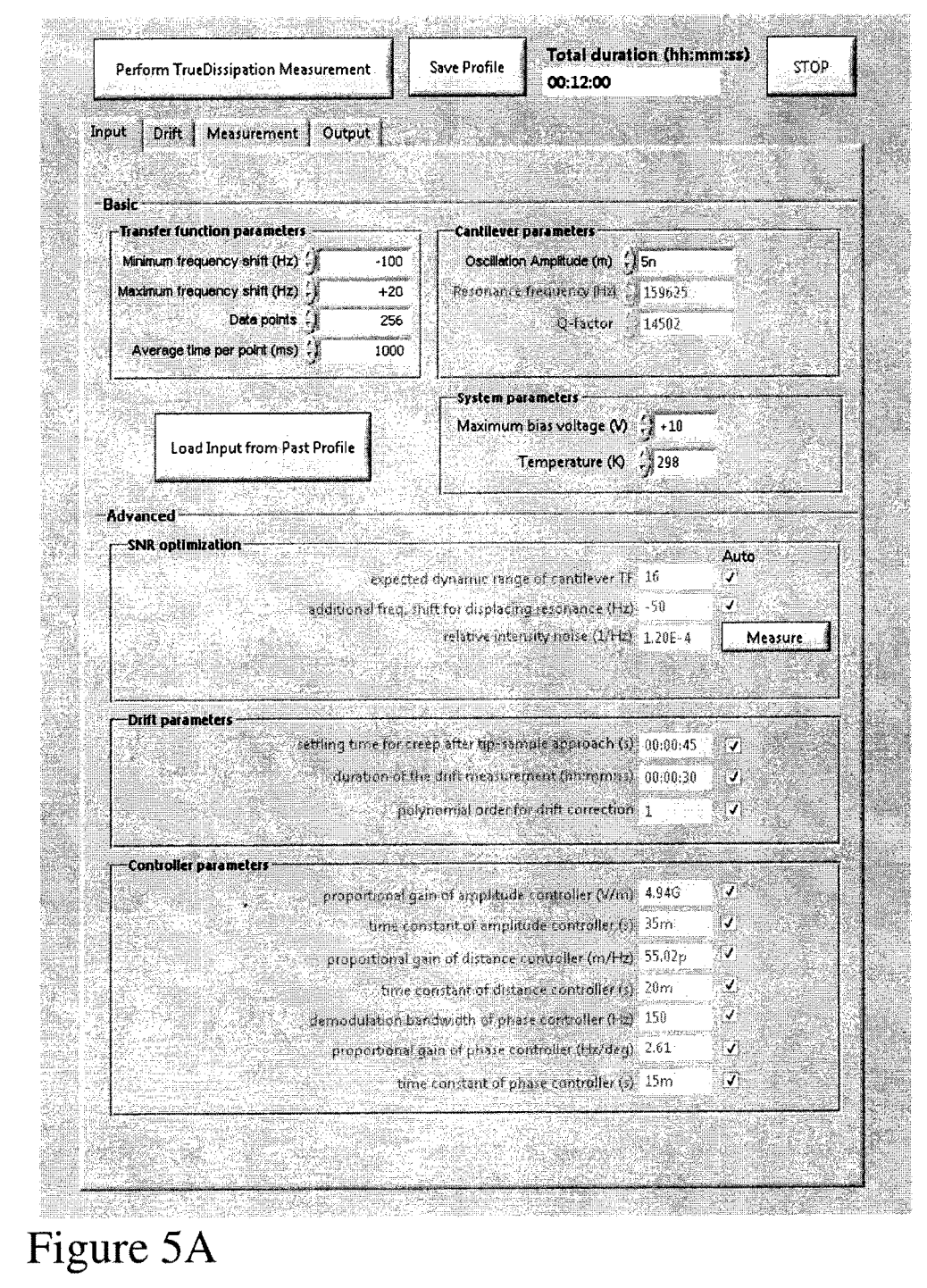

Referring to FIG. 5A there is depicted a user interface screenshot, representing one "Input" tab option presented to a user, according to an embodiment of the invention. The other tabs within the user interface being "Drift", "Measurement" and "Output." Within the "Input" screen the user may enter basic information relating to the transfer function parameters, in this case minimum and maximum frequency shifts, number of data points, and averaging time per point. Additionally the user may enter temperature and maximum bias voltage data together with cantilever parameters. Within the advanced section the user may deselect automatic determination of system parameters, for example drift and controller, together with optimization parameters, for example SNR, wherein they are able to enter values themselves directly. The screen also allows a user to load data from a previously stored profile. At the top the user is able to select whether to perform a "True Dissipation" measurement, save the profile they have created, or stop the process. Additionally they can establish a duration for the measurements.

Figure 5B:
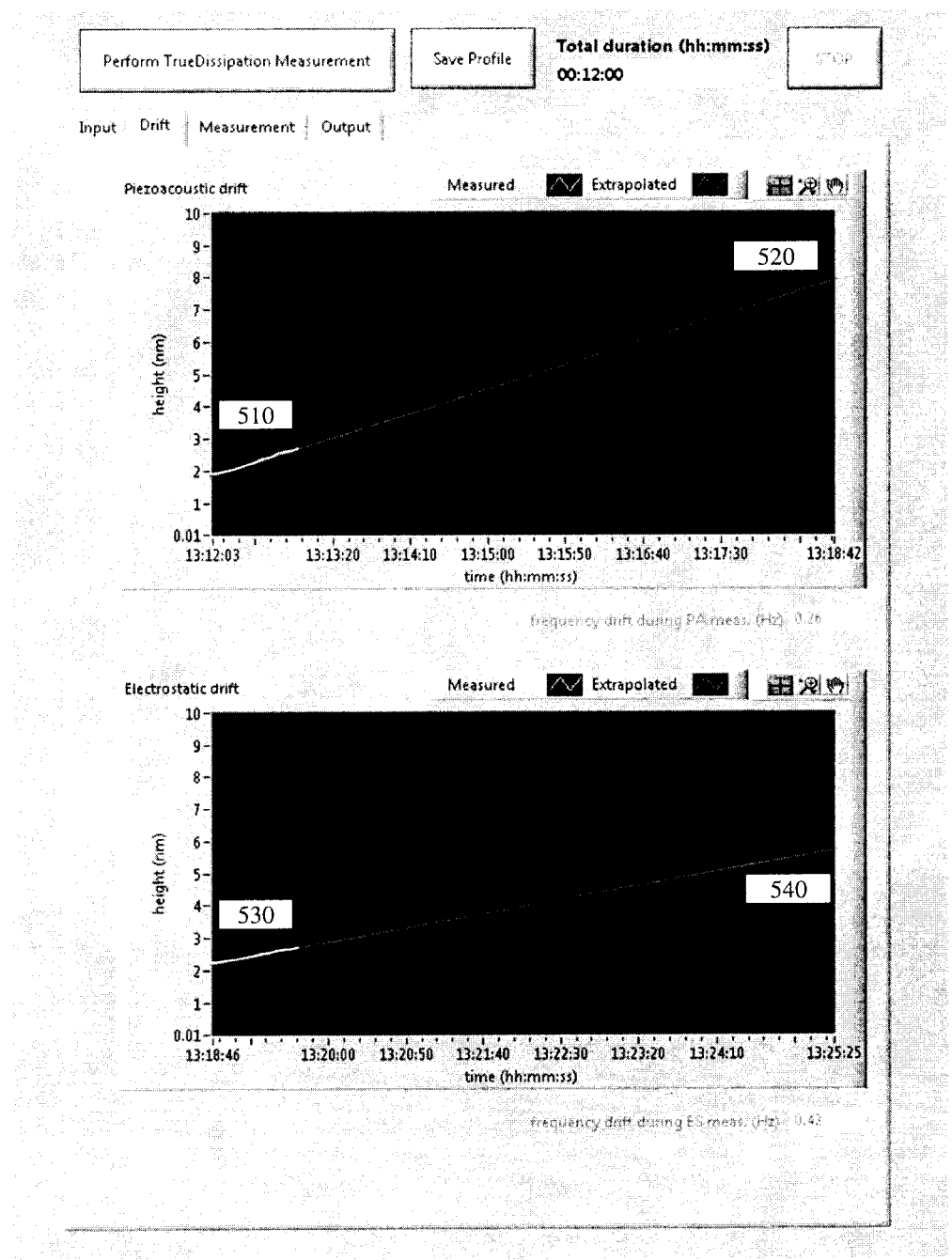
FIGS. 5A through 6B depict user interface screens according to an embodiment of the invention.

Accordingly the user may proceed to the "Drift" screen through selection of the appropriate tab wherein they are presented with a user screen such as depicted in FIG. 5B. According in the upper graph they are presented with a visual display of the piezoacoustic drift including the measured piezoacoustic drift 510 and extrapolated piezoacoustic drift 520 based upon periodic fitting of a predetermined drift function to the measured drift 510. In the lower graph they are presented with the electrostatic drift with similar measured electrostatic drift 530 and extrapolated electrostatic drift 540. As shown approximately 55 seconds of data have been acquired from an overall test time of displayed graph duration approximately 6 minutes 40 seconds.

Figure 6A:
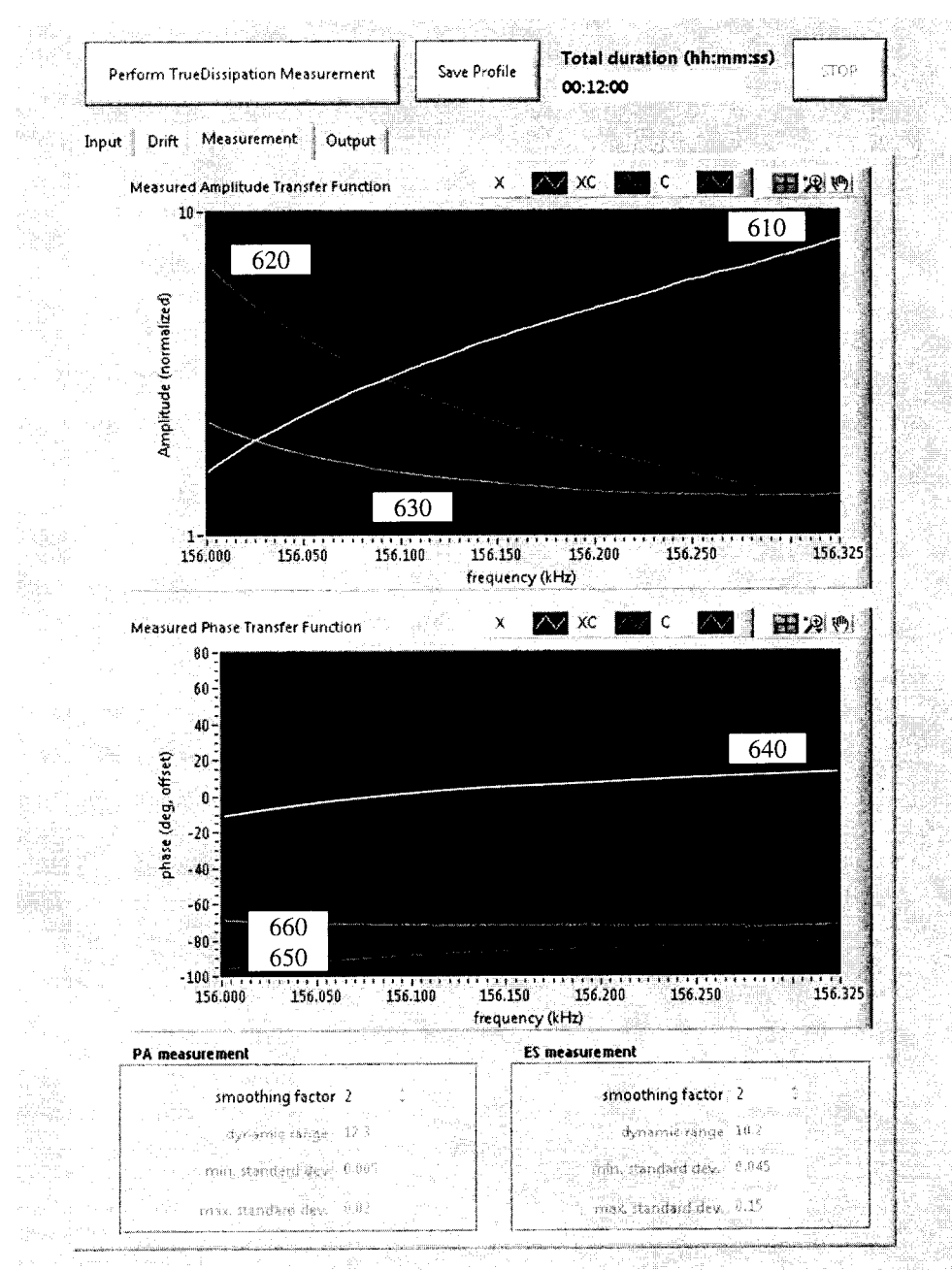
Figure 6B:
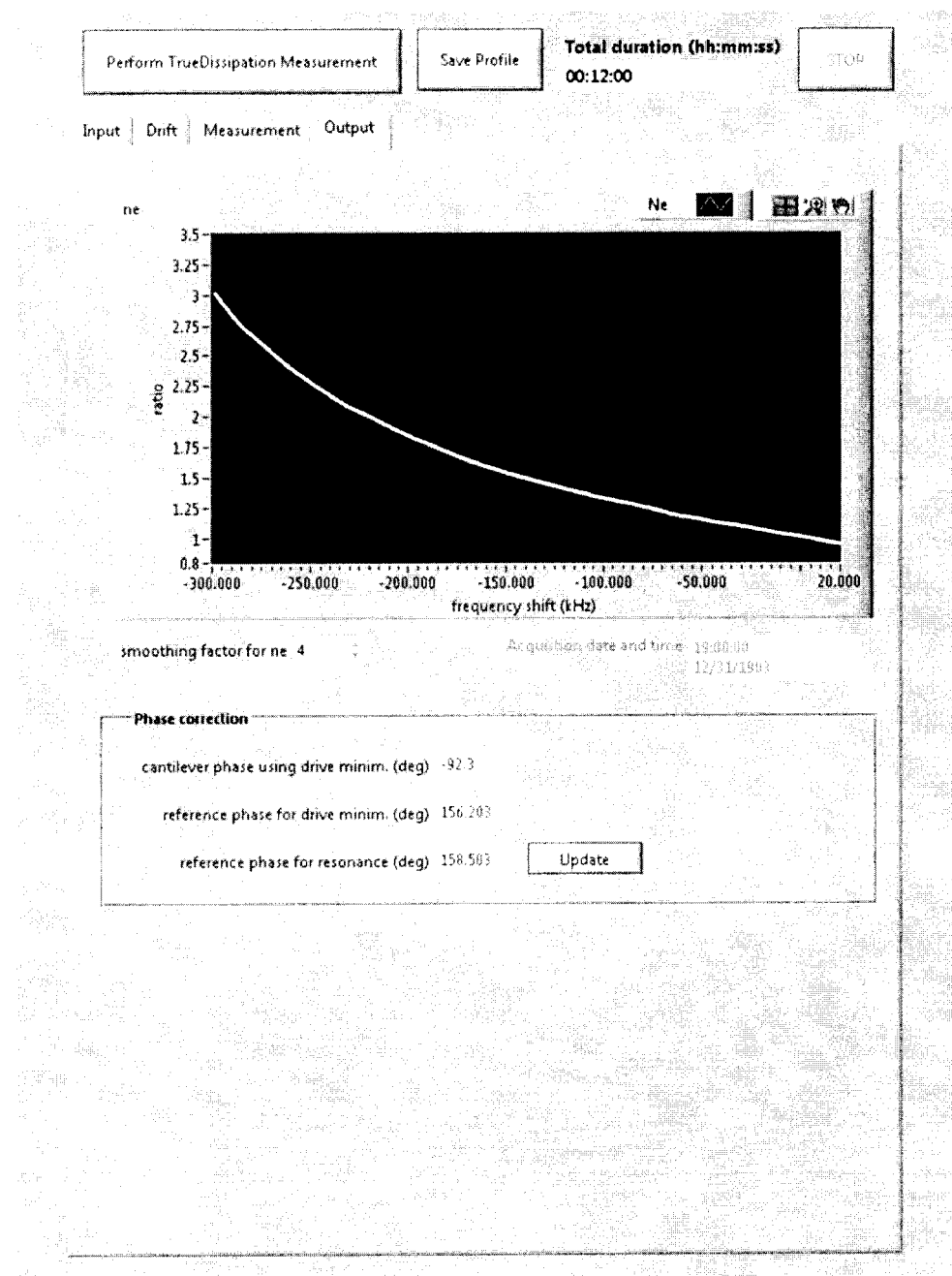

Now referring to FIG. 6A there is depicted an exemplary screen presented to user when accessing the "Measurement" tab wherein in the upper graph the "Measured Amplitude Transfer Function" is displayed versus frequency for $\Im$ 610, $\aleph$ 620, and $\aleph \Im$ 630, which are titled C, X, and XC respectively within the screen. Similarly within the lower graph $\Im$ 640, $\aleph$ 650, and $\aleph$ 660 respectively display the "Measured Phase Transfer Function" as a function of frequency. Each graph being over the frequency range 156.000 kHz to 156.325 kHz and displayed with a smoothing factor as set within the lowest portion of the screen. Referring to FIG. 6B there is depicted an exemplary screen presented to the user when accessing the "Output" tab of the user interface wherein the ratio "Ne" is plotted as a function of frequency shift from 300 kHz to 20 kHz.

Figure 7:
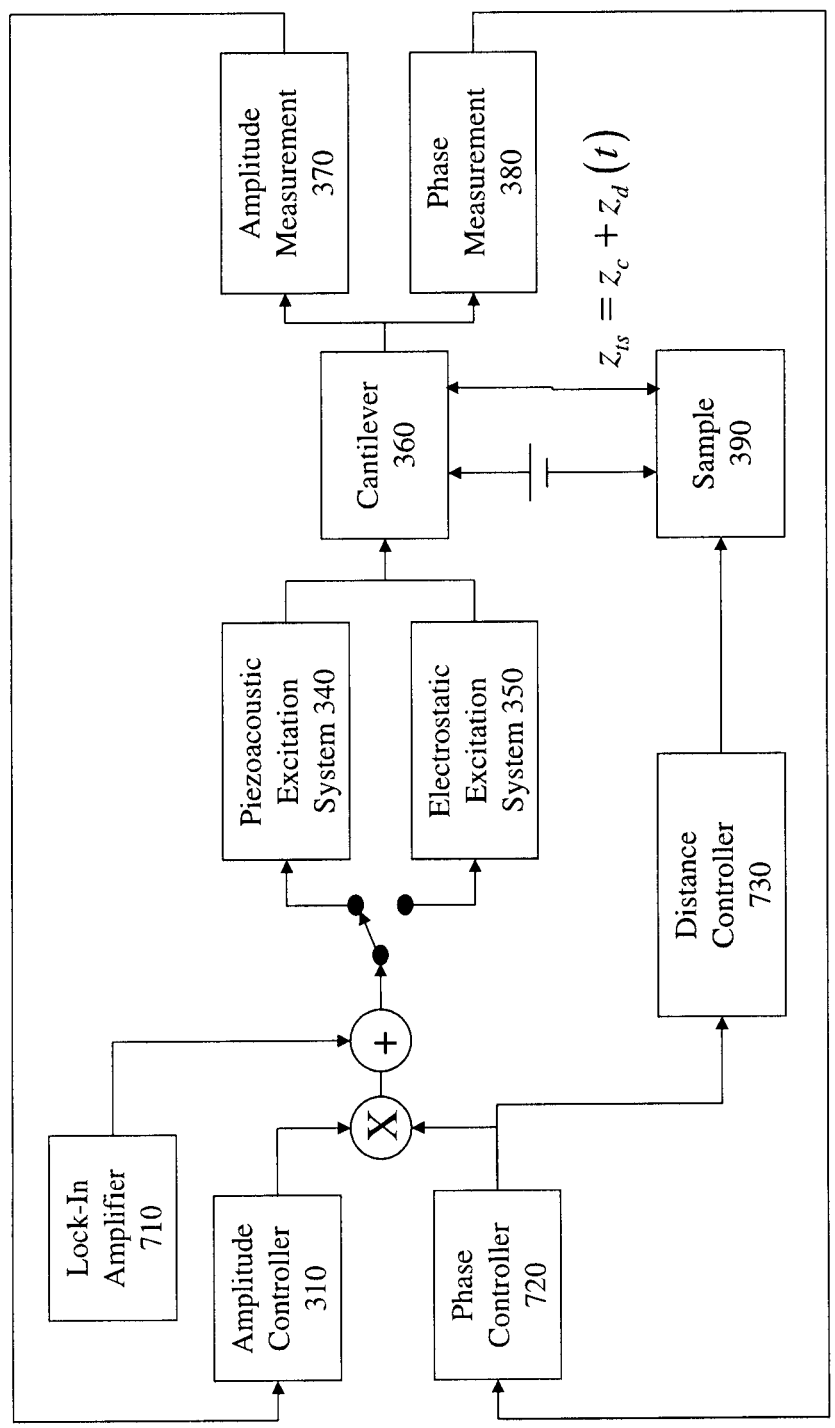
FIGS. 7 and 8 depict a system diagram and process flow of an FM-AFM system used in implementing a Drift Free protocol according to an embodiment of the invention.

2. Drift Free True Dissipation Protocol 2.1 System Diagram:

The system diagram is presented in FIG. 7 for a Drift Free FM-AFM system 700 used for implementing the Drift Free True Dissipation protocol. As depicted Drift Free FM-AFM system 700 comprises a Cantilever 360 wherein the separation of the Cantilever 360 and Sample 390 is controlled through Distance Controller 730 which is coupled to Phase Controller 360. The Cantilever 360 is coupled to Amplitude Measurement 370 and Phase Measurement 380 elements which couple to Amplitude Controller 310 and Phase Controller 720 respectively. The outputs of these two elements being combined and selectively coupled to either a Piezoacoustic Excitation System 340 or Electrostatic Excitation System 350, each of which are coupled to the Cantilever 360 thereby completing the FM-AFM system 700. Relative to the True Dissipation Protocol described above in the preceding Section 1 the following differences exist between FM-AFM 300 and Drift Free FM-AFM 600 are:

Lock-in amplifier 710 has been added which is combined with the outputs of the Amplitude Controller 310 and Phase Controller 720;

Phase Controller 720 operates only in closed-loop control mode; and

Distance Controller operates only in closed-loop control mode.

The lock-in amplifier runs under frequency sweep mode; $F \sim ([f_{min}, f_{max}], N_F, T_F)$ where $N_F$ is the number of data points and T, the averaging time per data point.

2.2 User Input:

As discussed supra in respect of True Dissipation Protocol in Section 1 a user interface allows the AFM user to set parameters directly through their own input, through calculations automatically performed by the AFM protocol, or retrieved from a previous stored configuration. The entries outlined below in respect of Table 3 are those within user interface according to an embodiment of the invention that can be configured.

TABLE 3

Parameters Which May Be Automatically Established or Set by User

| | | |
|---|---|---|
| Transfer Function Parameters | $\Delta f_{min}$ | Minimum frequency shift (negative) |
| | $\Delta f_{max}$ | Maximum frequency shift (positive) |
| | $N_F$ | Number of data points |
| | $T_F$ | Averaging time per data point |
| Cantilever Parameters | $A_{set}$ | Cantilever amplitude set point |
| | $f_0$ | Cantilever resonance frequency |
| | Q-factor | Cantilever Q-factor |
| System Parameters | $V_{b, max}$ | Maximum allowable bias voltage |
| SNR Optimization | $\Delta f_{add}$ | Additional frequency shift for displacing resonance |
| | $T_{TD}$ | Total desired duration of the True Dissipation measurement |
| Controller Parameters | $P_A$ | Proportional gain of amplitude controller |
| | $\tau_A$ | Time constant of amplitude controller |
| | $P_Z$ | Proportional gain of distance controller |
| | $\tau_Z$ | Time constant of distance controller |
| | $\tau_F^{-1}$ | Demodulation bandwidth of phase controller |
| | $P_F$ | Proportional gain of phase controller |
| | $\tau_F$ | Time constant of phase controller |

Figure 8:
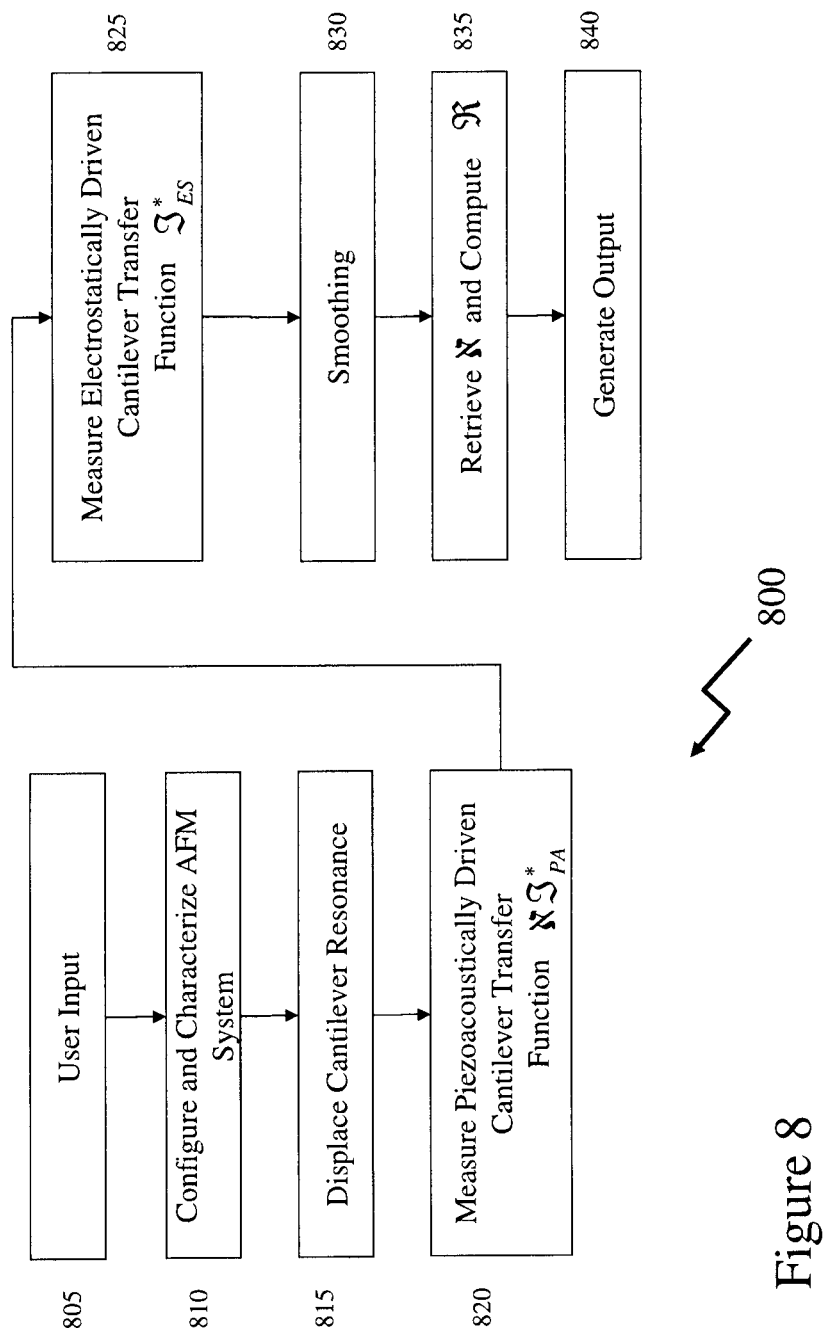

2.3 Drift Free True Dissipation Protocol:

The Drift Free True Dissipation protocol consists of a series of steps which establish the AFM, such as Drift Free AFM system 700 in FIG. 7, into one or more predetermined configurations to obtain the required calibration, setting, and measurement data to provide the processing of the measured AFM data to derive the actual measurement data. Referring to FIG. 8 the True Dissipation protocol is shown as a process flow 800 comprising steps 805 through 840 which are listed in 2.2 User Input together with sections 2.3A through 2.3F below and the output data derivation outlined in section 2.4.

2.3A: Configure and Characterize AFM System:

The state of the AFM is set to $\{A \circlearrowleft (A_{set}, P_A, \tau_A); F \circlearrowleft (\theta_{ref}, P_F, \tau_F); Z \sim (\text{retracted}); V_b = \phi; PA\}$, indicating the mode of operation of the amplitude, frequency, and distance controllers, the bias voltage (set to open circuit in this case), and "PA" refers to piezoacoustic excitation. Accordingly $f_{osc}$ is swept to determine the $\aleph \Im(f)$ maximum, defined as the unperturbed cantilever resonance frequency $f_0$ (store) and the phase reference $\theta_{ref}$ (store) which corresponds to the drive-minimization frequency.

2.3B: Displace Cantilever Resonance:

The state of the AFM is now adjusted to $\{A \circlearrowleft (A_{set},P_A,\tau_A); F \circlearrowleft (\theta_{ref},P_F,\tau_F); Z \curvearrowleft (\text{retracted}); V_b=V_{b,max}; PA\}$, wherein the bias voltage is set to the maximum. Next the distance controller is engaged to approach the sample to the target set point $\Delta f_{tar}=\Delta f_{min}+\Delta f_{add}$ thereby setting the AFM state to $\{A \circlearrowleft (A_{set},P_A,\tau_A); F \circlearrowleft (\theta_{ref},P_F,\tau_F); Z \circlearrowleft (\Delta f_{tar},P_Z,\tau_Z); V_b=V_{b,max}; PA\}$. At this point the perturbed resonance frequency $f^*_0=f_0+\Delta f_{min}+\Delta f_{add}$. The process then checks to see that $f^*_0$ has in fact been reached, and if it has not the process prompts the user.

2.3C Measure Piezoacoustically Driven Cantilever Transfer Function $\aleph \Im^*_{PA}$:

Acquire and store piezoacoustically driven cantilever transfer function $\aleph \square^*_{PA}$ by placing the AFM into state $\{A \circlearrowleft (A_{set},P_A,\tau_A); F \circlearrowleft (\theta_{ref},P_F,\tau_F); F \curvearrowleft ([f_{min},f_{max}],N_F,T_F); Z \circlearrowleft (\Delta f_{tar},P_Z,\tau_Z); V_b=V_{b,max}; PA\}$. The raw drive signal $V_{d,PA}(f)$ is also stored for future reference. Alternatively, this can be performed in constant-drive mode with drive amplitude $V_{d,PA}$ (store) such that the AFM is now in the state $(A \curvearrowleft V_{d,PA}(f) F \circlearrowleft (\theta_{ref},P_F,\tau_F); \quad F \curvearrowleft ([f_{min},f_{max}],N_F,T_F); Z \circlearrowleft (\Delta f_{tar},P_Z,\tau_Z); V_b=V_{b,max}; PA\}$ 2.3D Measure Electrostatically Driven Cantilever Transfer Function $\Im^*_{ES}$:

Now the AFM is switched to electrostatic attraction and established to the state $\{A \circlearrowleft (A_{set},P_A,\tau_A); F \circlearrowleft (\theta_{ref},P_F,\tau_F); F \curvearrowleft ([f_{min},f_{max}],N_F,T_F)F \curvearrowleft ([f_{min},f_{max}],N_F,T_F); Z \circlearrowleft (\Delta f_{tar}, P_Z,\tau_Z); V_b=V_{b,max}; ES\}$ where "ES" denotes electrostatic excitation. The raw drive signal $V_{d,ES}(f)$ is also stored for future reference. Alternatively, this can be performed in constant-drive mode with drive amplitude $V_{d,PA}$ (store) such that the AFM is now in the state $A \curvearrowleft (V_{d,PA}); F \curvearrowleft ([f_{min}, f_{max}],N_F,T_F); Z \circlearrowleft (\Delta f_{tar},P_Z,\tau_Z); V_b=V_{b,max}; ES$ 2.3E Smoothing:

The resulting transfer functions $\aleph \Im^*_{PA}$ and $\Im^*_{ES}$ are smoothed using an algorithm which is selected in dependence upon one or factors including but not limited to noise density $n_d$, and acquisition time $T_F$.

2.3F Retrieve $\aleph$ and Compute $\Re$:

The retrieved piezoelectric excitation transfer function is modified according to Equation (4) below.

$$\aleph = \frac{\aleph \Im^*_{PA}}{\Im^*_{ES}} \quad (4)$$

This is then normalized so that $|\aleph(f_0)|=1$ and the phase $\theta \aleph$ offset such that $\theta \aleph (f_0)=-90°$. Accordingly the drive amplitude signal calibration factor $\Re(f)$ is established using Equation (5) below. Additional metadata relating to the measurement is stored in association with it including but not limited to, AFM user identity, AFM identity, AFM cantilever identity, sample identity, and date and time information. This data together with measurement data, including but not limited to, drive amplitude signal calibration factor $\Re(f)$, electrostatic and piezoacoustic excitation system transfer functions $\aleph_{ES}$ and $\aleph_{PA}$ respectively, raw electrostatic and piezoacoustic drive signals $V_{d,ES}$ and $V_{d,PA}$ respectively, and piezoelectric excitation transfer function $\aleph$. The results may be processed live or offline for a variety of reasons including, but not limited to, for display to the user and for calibration.

$$\Re(f) = \Re \left| \frac{\sin(\theta_{\Im_s} - \theta_{\aleph}(f))}{\Im_{\Im_s}} \right| \times \aleph(f) \Big|^{-1} \quad (5)$$

2.4 Generate Output:

Based upon the operation of the Drift Free True Dissipation protocol discussed above multiple outputs are generated and stored by the AFM as listed below in respect of Table 4.

TABLE 4

List of Generated Outputs from True Dissipation Protocol

| | | |
|---|---|---|
| Values | $f_0$ | Cantilever resonance frequency |
| | $\theta_{Cs}$ | Starting phase of cantilever transfer function, when using the drive minimization method, generally $\theta_{Cs} \neq 90°$ |
| | $\theta_{ref}$ | Reference phase of controller corresponding to drive minimization criterion |
| | $\theta_{ref, new}$ | New reference phase of controller corresponding to cantilever resonance $\theta_{ref, new} = \theta_{ref} - \theta_{Cs} + 90°$ |
| Functions for Graphing | $\|\aleph(f)\|$ | amplitude component of $\aleph(f)$ - normalized at $f_0$ |
| | $\theta_\aleph(f)$ | amplitude component of $\aleph(f)$ - offset to $-90°$ normalized at $f_0$ |
| | $\alpha_\aleph(f)$ | Normalized slope of $\|\aleph(f)\|$; $\alpha_\aleph(f) = \frac{1}{\|\aleph(f)\|} \frac{\delta\|\aleph(f)\|}{\delta f}$ |
| | $\beta_\aleph(f)$ | Slope of $\theta_\aleph(f)$; $\beta_\aleph(f) = \frac{\delta\|\aleph(f)\|}{\delta f}$ |
| Post-Processing Input | $S_{PA}$ | Smoothing factor for piezoacoustic transfer function |
| | $S_{ES}$ | Smoothing factor for electrostatic transfer function |
| | $S_{NE}$ | Smoothing factor for the final $\Re(f)$ calibration function |
| | $S_{NE}$ | Smoothing factor for the final $\alpha_\aleph(f)$ and $\beta_\aleph(f)$ functions |

Accordingly it would be evident to one skilled in the art that the inventors have established protocols, referred to as True Dissipation and Drift Free True Dissipation, which address limitations in the prior art by correcting the apparent damping arising from the non-flat frequency response of the piezoacoustic cantilever excitation system allowing dissipation measurements to be reliably obtained and quantitatively compared to theoretical models as well as offsetting the cantilever resonance frequency outside the frequency range of the measurements to reduce the impact of frequency drifts. According to embodiments of the invention these improvements are achieved by applying one or more modifications to an FM-AFM system, these modifications including, but not limited to, the following:

Reduction of frequency drift by applying a bias voltage to the cantilever and bringing the cantilever to the sample being characterised;

Reduction of frequency drift caused by cantilever tip-sample drift by measuring the cantilever tip-sample drift and reducing it by using feed-forward compensation during the measurement cycle; and Performing constant-amplitude transfer function measurements aided by an amplitude controller to reduce the effects of non-linearities as well as convolution effects due to the finite response time of the system.

Additional modifications include:

Using the measurement of $\aleph$ to predict the frequency dependent phase offset of the FM-AFM system and to feed it forward with a phase controller to maintain the cantilever on resonance while the frequency shift varies; and Using the measurement of $\aleph$ to recover the accurate cantilever transfer function which can be used to determine the true Q factor of the cantilever by analyzing the amplitude or phase component of the cantilever transfer function.

Specific details are given in the above description to provide a thorough understanding of the embodiments. However, it is understood that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above and/or a combination thereof.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be rearranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages and/or any combination thereof. When implemented in software, firmware, middleware, scripting language and/or microcode, the program code or code segments to perform the necessary tasks may be stored in a machine readable medium, such as a storage medium. A code segment or machine-executable instruction may represent a procedure, a function, a subprogram, a program, a routine, a subroutine, a module, a software package, a script, a class, or any combination of instructions, data structures and/or program statements. A code segment may be coupled to another code segment or a hardware circuit by passing and/or receiving information, data, arguments, parameters and/or memory contents. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor and may vary in implementation where the memory is employed in storing software codes for subsequent execution to that when the memory is employed in executing the software codes. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, wireless channels and/or various other mediums capable of storing, containing or carrying instruction(s) and/or data.

The methodologies described herein are, in one or more embodiments, performable by a machine which includes one or more processors that accept code segments containing instructions. For any of the methods described herein, when the instructions are executed by the machine, the machine performs the method. Any machine capable of executing a set of instructions (sequential or otherwise) that specify actions to be taken by that machine are included. Thus, a typical machine may be exemplified by a typical processing system that includes one or more processors. Each processor may include one or more of a CPU, a graphics-processing unit, and a programmable DSP unit. The processing system further may include a memory subsystem including main RAM and/or a static RAM, and/or ROM. A bus subsystem may be included for communicating between the components. If the processing system requires a display, such a display may be included, e.g., a liquid crystal display (LCD). If manual data entry is required, the processing system also includes an input device such as one or more of an alphanumeric input unit such as a keyboard, a pointing control device such as a mouse, and so forth.

The memory includes machine-readable code segments (e.g. software or software code) including instructions for performing, when executed by the processing system, one of more of the methods described herein. The software may reside entirely in the memory, or may also reside, completely or at least partially, within the RAM and/or within the processor during execution thereof by the computer system. Thus, the memory and the processor also constitute a system comprising machine-readable code.

In alternative embodiments, the machine operates as a standalone device or may be connected, e.g., networked to other machines, in a networked deployment, the machine may operate in the capacity of a server or a client machine in server-client network environment, or as a peer machine in a peer-to-peer or distributed network environment. The machine may be, for example, a computer, a server, a cluster of servers, a cluster of computers, a web appliance, a distributed computing environment, a cloud computing environment, or any machine capable of executing a set of instructions (sequential or otherwise) that specify actions to be taken by that machine. The term "machine" may also be taken to include any collection of machines that individually or jointly execute a set (or multiple sets) of instructions to perform any one or more of the methodologies discussed herein.

The foregoing disclosure of the exemplary embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. An atomic force microscope system comprising:
a cantilever;
a translation system for adjusting the spacing between the cantilever and a sample; and
a controller for controlling the atomic force microscope to perform a measurement by executing a measurement process,
wherein the measurement process when executed at least one of:
reduces frequency drift by applying a bias voltage to the cantilever and reduce the spacing between the cantilever and the sample such that a resonance frequency of the cantilever is moved to outside a measurement frequency range of the measurement process;
reduces frequency drift arising from drift within the translation system by measuring drift during a first portion of the measurement process and employing it within a feed-forward compensation process within a second portion of the measurement process;
reduces the effects of at least one of non-linearities and convolution effects arising from a finite response time of at least the cantilever by performing constant-amplitude transfer function measurements;
maintains the cantilever on resonance by using a measurement of the cantilever excitation transfer function to predict a frequency dependent phase offset of measurements and feed it forward via a phase controller; and
recovers an accurate cantilever transfer function from a measured cantilever excitation transfer function and determines a quality factor of the cantilever in dependence upon either an amplitude component or phase component of the accurate cantilever transfer function.

2. The atomic force microscope system according to claim 1, wherein reducing the frequency drift by applying a bias voltage to the cantilever and reduce the spacing between the cantilever reduces errors introduced into an energy dissipation measurement arising from a piezoacoustic excitation transfer function between the cantilever and the sample are reduced.

3. The atomic force microscope system according to claim 1, wherein the atomic force microscope further comprises:
at least one of an amplitude controller and a phase controller, the at least one of providing a drive signal to the cantilever; and
at least one of an amplitude measurement system and a phase measurement system,
wherein the controller reduces frequency drift by:
measuring a frequency shift caused by an interaction between cantilever and a sample mounted to a sample holder with the at least one of the amplitude controller and the phase controller, the frequency shift relating to the drive signal applied to the cantilever; and
reducing errors in tracking the frequency shift caused by the interaction between the cantilever and the sample by feeding forward a correction signal derived in dependence upon at least the measured frequency shift during making measurements on the sample.

4. The atomic force microscope system according to claim 1, wherein the controller reduces the effects of at least one of non-linearities and convolution effects by performing transfer function measurements at a constant predetermined amplitude with the cantilever and the sample by employing an amplitude controller selectively coupled to at least one of an electrostatic excitation system and a piezoacoustic excitation system.

5. The atomic force microscope system according to claim 1, wherein the controller maintains the cantilever on resonance by:
measuring using measurements of a piezoacoustic excitation system transfer function for the cantilever and establishing a frequency dependent phase offset; and
feeding forward a correction signal with the controller, the correction signal determined in dependence upon at least the frequency dependent phase offset.

6. The atomic force microscope system according to claim 1, wherein the controller:
recovers an accurate cantilever transfer function and determines a quality factor of the cantilever by establishing a piezoacoustic excitation system transfer function of the cantilever;
recovers at least one of an amplitude component and a phase component of the piezoacoustic excitation system transfer function; and
determines the quality factor in dependence upon the at least one of the amplitude component and the phase component of the piezoacoustic excitation system cantilever transfer function.

* * * * *